(12) United States Patent
Flores Guerra

(10) Patent No.: US 10,482,127 B2
(45) Date of Patent: *Nov. 19, 2019

(54) VIEWING SUGGESTIONS BASED ON CLOSED-CAPTIONED CONTENT FROM MULTIPLE TUNERS

(71) Applicant: DISH Technologies L.L.C., Englewood, CO (US)

(72) Inventor: Jesus Flores Guerra, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/872,597

(22) Filed: Jan. 16, 2018

(65) Prior Publication Data

US 2018/0192083 A1 Jul. 5, 2018

Related U.S. Application Data

(63) Continuation of application No. 15/408,060, filed on Jan. 17, 2017, now Pat. No. 9,900,632.
(Continued)

(51) Int. Cl.
*H04N 7/173* (2011.01)
*G06F 16/78* (2019.01)
(Continued)

(52) U.S. Cl.
CPC ..... *G06F 16/7867* (2019.01); *H04N 21/4263* (2013.01); *H04N 21/435* (2013.01);
(Continued)

(58) Field of Classification Search
CPC ............. H04N 21/235; H04N 21/4263; H04N 21/458; H04N 21/4334; H04N 21/8405;
(Continued)

(56) References Cited

U.S. PATENT DOCUMENTS 5,990,927 A 11/1999 Hendricks et al.
6,378,129 B1 * 4/2002 Zetts ................. H04L 29/06027
348/E5.008
(Continued)

FOREIGN PATENT DOCUMENTS

WO 2000/062533 A1 10/2000
WO 2002/102046 A1 12/2002
(Continued)

OTHER PUBLICATIONS

U.S. Appl. No. 15/408,060, filed Jan. 17, 2017, Notice of Allowance dated Oct. 13, 2017, all pages.

*Primary Examiner* — Michael B. Pierorazio

(57) ABSTRACT

Described are systems, methods and computer program products for suggesting television programs to a user by, for example, analyzing closed caption or subtitle content of unwatched or unrecorded video content to determine if the video content is of interest to the user. The user may indicate one or more keywords for use in the analysis and the analysis may scan the text of the closed caption or subtitle content to identify matches to the keywords. Beside user input keywords, the keywords may also be determined through analysis of video content watched or recorded by the user to determine frequently encountered words. These frequently encountered words may automatically be used in matching the text of the closed caption or subtitle content. The users may also or alternatively select particular words of the frequently encountered words to use for matching.

20 Claims, 11 Drawing Sheets

Related U.S. Application Data

(60) Provisional application No. 62/440,621, filed on Dec. 30, 2016.

(51) Int. Cl.
| | |
|---|---|
| *H04N 21/488* | (2011.01) |
| *H04N 21/8405* | (2011.01) |
| *H04N 21/426* | (2011.01) |
| *H04N 21/435* | (2011.01) |
| *H04N 21/44* | (2011.01) |
| *H04N 21/472* | (2011.01) |
| *H04N 21/475* | (2011.01) |
| *H04N 21/482* | (2011.01) |

(52) U.S. Cl.
CPC ... *H04N 21/44008* (2013.01); *H04N 21/4755* (2013.01); *H04N 21/47214* (2013.01); *H04N 21/4826* (2013.01); *H04N 21/4884* (2013.01); *H04N 21/8405* (2013.01)

(58) Field of Classification Search
CPC .......... H04N 21/2187; H04N 21/4828; H04N 21/4884; H04N 21/431
See application file for complete search history.

(56) References Cited

U.S. PATENT DOCUMENTS

| | | | | |
|---|---|---|---|---|
| 6,625,811 | B1 * | 9/2003 | Kaneko | H04H 20/12 |
| | | | | 348/E7.063 |
| 8,005,826 | B1 * | 8/2011 | Sahami | H04N 21/4782 |
| | | | | 707/723 |
| 8,115,869 | B2 | 2/2012 | Rathod et al. | |
| 8,238,332 | B2 * | 8/2012 | Yamashita | H04N 7/015 |
| | | | | 370/366 |
| 8,533,761 | B1 * | 9/2013 | Sahami | H04N 5/44543 |
| | | | | 725/53 |
| 8,572,649 | B1 * | 10/2013 | Gossweiler, III | H04N 21/4532 |
| | | | | 725/39 |
| 8,578,042 | B2 * | 11/2013 | Hu | H04N 7/165 |
| | | | | 709/203 |
| 8,631,440 | B2 * | 1/2014 | Gossweiler, III | H04N 5/44543 |
| | | | | 725/52 |
| 8,826,443 | B1 * | 9/2014 | Raman | G06F 11/004 |
| | | | | 726/26 |
| 9,130,918 | B2 * | 9/2015 | Picconi | H04L 63/08 |
| 9,258,589 | B2 * | 2/2016 | Grouf | H04N 21/26283 |
| 9,900,632 | B1 * | 2/2018 | Flores Guerra | H04N 21/235 |
| 2002/0038457 | A1 * | 3/2002 | Numata | H04N 5/44543 |
| | | | | 725/47 |
| 2002/0120925 | A1 | 8/2002 | Logan | |
| 2002/0151992 | A1 | 10/2002 | Hoffberg et al. | |
| 2003/0126600 | A1 | 7/2003 | Heuvelman | |
| 2003/0212708 | A1 * | 11/2003 | Potrebic | G06F 16/58 |
| 2005/0246738 | A1 | 11/2005 | Lockett et al. | |
| 2007/0053513 | A1 | 3/2007 | Hoffberg | |
| 2007/0214488 | A1 | 9/2007 | Nguyen et al. | |
| 2007/0265857 | A1 | 11/2007 | Rao | |
| 2008/0271078 | A1 * | 10/2008 | Gossweiler | H04N 5/44543 |
| | | | | 725/40 |
| 2008/0271080 | A1 * | 10/2008 | Gossweiler | G06F 3/0486 |
| | | | | 725/47 |
| 2009/0070819 | A1 * | 3/2009 | Gajda | H04H 60/65 |
| | | | | 725/46 |
| 2009/0300699 | A1 * | 12/2009 | Casagrande | H04N 5/76 |
| | | | | 725/116 |
| 2010/0325657 | A1 * | 12/2010 | Sellers | H04N 21/23424 |
| | | | | 725/32 |
| 2012/0110621 | A1 * | 5/2012 | Gossweiler, III | G06Q 50/01 |
| | | | | 725/46 |
| 2012/0192232 | A1 * | 7/2012 | Ellis | H04N 5/44543 |
| | | | | 725/41 |
| 2012/0272264 | A1 * | 10/2012 | Suzuki | H04N 21/23113 |
| | | | | 725/33 |
| 2013/0305287 | A1 * | 11/2013 | Wong | H04N 21/482 |
| | | | | 725/42 |
| 2014/0157312 | A1 * | 6/2014 | Williams | H04N 21/4126 |
| | | | | 725/39 |
| 2014/0189743 | A1 * | 7/2014 | Kennedy | H04N 21/44222 |
| | | | | 725/46 |
| 2014/0201230 | A1 | 7/2014 | Messer et al. | |
| 2014/0351843 | A1 * | 11/2014 | Theriault | H04N 21/2668 |
| | | | | 725/25 |
| 2014/0366068 | A1 * | 12/2014 | Burkitt | H04N 21/431 |
| | | | | 725/61 |

FOREIGN PATENT DOCUMENTS

| | | |
|---|---|---|
| WO | 2008/093989 A1 | 8/2008 |
| WO | 2008/115009 A1 | 9/2008 |
| WO | 2008/123720 A1 | 10/2008 |
| WO | 2008/140270 A1 | 11/2008 |
| WO | 2013/066503 A1 | 5/2013 |

* cited by examiner

VIEWING SUGGESTIONS BASED ON CLOSED-CAPTIONED CONTENT FROM MULTIPLE TUNERS

CROSS-REFERENCES TO RELATED APPLICATIONS

This application is a continuation of U.S. patent application Ser. No. 15/408,060, filed on Jan. 17, 2017, which claims the benefit of and priority to U.S. Provisional Patent Application No. 62/440,621, filed on Dec. 30, 2016. These applications are hereby incorporated by reference in their entireties for all purposes.

FIELD

This application relates generally to suggesting television programs to viewers. More specifically, the application provides techniques for determining suggested programs using closed caption or subtitle information

BACKGROUND

Television receivers may automatically suggest and record new programs based on the similarity of the new programs to other programs previously recorded by the user. However, the suggested programs may not always be of interest to the user, so alternative suggestion techniques may warrant further exploration.

SUMMARY

Described herein are systems, methods, and computer program products for providing suggested programming to a user based on closed caption or subtitle data from channels not being watched or recorded by a user. The systems, methods and computer program products may use the closed caption or subtitle data from the unwatched channels as a more comprehensive data source than just a program title or synopsis to provide better program suggestions to the user in real-time as the programs are broadcast on the unwatched channels. Advantageously, the disclosed systems, methods, and products permit new ways to utilize unused tuners and simultaneously allow users to have program content that may be of interest identified for them.

As an example, a brief synopsis of a program available in a program guide may not actually describe any of the specific information depicted in the program, such as occurs for most news broadcasts or other programming. A user may have interest in seeing a news report on a particular subject, but the synopsis may only indicate that the news program is describing news of the day without a description of any of the specific news reports. Using the present invention, a user may be alerted when a subject of interest is depicted and the user may command their television receiver to display or record the news program so that the program can be immediately watched or watched at a later time.

In a first aspect, methods are provided herein, such as methods for generating suggested programming for a user or viewer. An example method of this aspect comprises receiving, such as by a television receiver, video content using an inactive tuner of the television receiver; obtaining text data corresponding to an audio portion of the video content; evaluating or analyzing the text data to identify frequencies of words appearing in the text data; receiving input corresponding to determination of one or more user-designated keywords; storing the one or more user-designated keywords to a word list, such as a word list that includes at least a first keyword; determining, that the first keyword appears in the text data with a first frequency greater than a first threshold frequency; and generating a first interface for display on a display device in real-time upon determining that the first frequency is greater than the first threshold frequency, wherein the first interface includes a notification identifying a match of the first keyword. Optionally, the television receiver includes a plurality of tuners.

It will be appreciated that the terms "inactive tuner," "idle tuner," and "unused tuner" may correspond to tuners of a television receiver that are unused for conventional display or recording purposes. For example, the inactive tuner may correspond to a tuner of the television receiver that is not being actively used to display live video content on the display device. As another example, the inactive tuner may correspond to a tuner of the television receiver that is not being actively used to record video content according to a recording schedule or timer. In this way, television receivers including a plurality of tuners may have any number of inactive tuners used for a non-conventional purpose in suggesting programming potentially of interest to a user or viewer.

Various sources of the text data are contemplated. For example, obtaining the text data optionally includes decoding a closed caption portion of the video content to generate the text data. Alternatively or additionally, obtaining the text data includes decoding a subtitle portion of the video content to generate the text data. Optionally, obtaining the text data includes retrieving the text data from a network location, such as a location on an Internet server. Other techniques for obtaining the text data are contemplated. For example, obtaining the text data optionally includes processing the audio portion of the video content using a speech-to-text algorithm to generate the text data. Optionally, obtaining the text data includes rendering the video content with embedded closed captions or subtitles and generating the text data by performing character recognition on the embedded closed captions or subtitles. It will be appreciated that certain methods for generating the text data may be computationally prohibitive for some systems, but these techniques may be viable for specially constructed television receivers, such as with processors specially configured for speech-to-text or optical character recognition, as well as television receivers exhibiting suitable processing resources.

Optionally, the frequency of words in the text data are determined in order to allow for programming including repeated use of the same words to be identified as such. Such analysis allows for more flexible suggestion algorithms to be employed, such as algorithms in which the frequency of words in the text data are used to better identify program suggestions. Optionally, evaluating or analyzing the text data includes generating a database including one or more words in the text data and tracking appearances of the one or more words in the text data using the database. Optionally, each word is assigned a unique identifier to simplify the database, processing of the text data, and/or matching words in the text data to a keyword. Optionally, common words, such as pronouns, conjunctions, prepositions, articles, etc., may be removed or excluded from the analysis in order not to obscure the subject of the programming. Optionally, the list of removed or excluded words is user selectable or editable.

The keywords used for matching may be user determined or suggested for the user. For example, the input may optionally correspond to user entry of one or more user-designated keywords. Optionally, the input corresponds to selection of one or more user-designated keywords from a word list. The word list may be user selectable or editable.

Optionally, the keywords used for matching may be automatically determined. For example, programs watched or recorded by the user may have their text data scanned and analyzed to determine commonly used words and some of these words, such as the most common words, may be automatically added to the word list or may be suggested to the user for adding to the word list. Optionally, a method of this aspect comprises or further comprises automatically adding one or more keywords to the word list without user input. Alternatively or additionally, a method of this aspect comprises or further comprises generating the word list by monitoring recorded or watched text data corresponding to audio portions of at least one of video content recorded by the television receiver and video content output by the television receiver for immediate display on the display device; evaluating the recorded or watched text data to rank words appearing in the watched or recorded text data by frequency; and adding one or more words appearing in the recorded or watched text data having rankings greater than a threshold ranking to the word list. Optionally, common words, such as pronouns, conjunctions, prepositions, articles, etc., may be removed from the analysis or When words appearing in the text data match words in the word list, it may be desirable to ensure that the matched word appears in the text data multiple times before suggesting the programming to a user or viewer. This may eliminate or reduce false positive detections or suggested programming that is not of interest to the user. Optionally, the first threshold frequency is user selectable. For example, the first threshold frequency may correspond to a specific number of appearances or occurrences of keywords in the text data. Optionally, the first threshold frequency may correspond to 0, 1, 2, 3, 4, 5, 6, 7, 8, 9, 10 occurrences of a match of words in the text data to keywords in the word list. Optionally, the first threshold frequency corresponds to a specific number of appearances or occurrences of keywords in the text data within a specific amount of time, such as N or more occurrences within 10 seconds, N or more occurrences within 30 seconds, N or more occurrences within 60 seconds, N or more occurrences within 5 minutes, or N or more occurrences within 15 minutes, where N represents a threshold number, such as 1, 2, 3, 4, 5, 6, 7, 8, 9, 10, etc.

It may also or alternatively be useful to detect matches of more than one word in order to eliminate or reduce false positive detections or suggested programming that is not of interest to the user. For example, it may be useful to match words in the text data to 1, 2, 3, 4, or 5 keywords in the word list. For example, the word list may optionally include a second keyword and methods of this aspect may comprise or further comprise determining that the second keyword appears in the text data with a second frequency greater than a second threshold frequency. Optionally, generating the first interface includes generating the first interface in real-time upon determining that both the first frequency is greater than the first threshold frequency and the second frequency is greater than the second threshold frequency. Optionally, the first interface includes a notification identifying a match of the first keyword, the second keyword, or both the first keyword and the second keyword.

Various algorithms may be used to determine that the first keyword appears in the text data with the first frequency greater than the first threshold frequency. For example, determining that the first keyword appears in the text data with the first frequency greater than the first threshold frequency may include comparing words appearing in the text data having frequencies greater than the first threshold frequency with the first keyword to determine the match. Alternatively or additionally, determining that the first keyword appears in the text data with the first frequency greater than the first threshold frequency includes searching a database including one or more words in the text data using the first keyword to identify a number or frequency of appearances of the first keyword in the text data; and determining that the number or frequency of appearances of the first keyword in the text data is greater than the first threshold frequency.

An interactive interface may optionally be generated upon detection of a suitable match between a keyword and words in text data. The interactive interface may, for example, correspond to an element of a graphical user interface, an element of an electronic programming guide, or an overlay element provided on top of or alternative to video content being output for display on a display device. Optionally, the first interface requests selection of a command. Useful commands include, but are not limited to, at least one of a command to record the video content, a command to immediately display the video content, or a command to ignore the video content. Optionally, a method of this aspect may comprise or further comprise receiving user input corresponding to determination of a command to record the video content, immediately display the video content, or ignore the video content. Optionally, the first interface corresponds to a notification overlayed on a graphical user interface, an electronic programming guide, or other video content being output for display on the display device.

It will be appreciated that multiple tuners of a television receiver may be used for generating suggested programming in accordance with various aspects of the invention disclosed herein. Each tuner may optionally be utilized in identical or similar ways as described above, such as for generating suggested programming, displaying live broadcast content in real-time or with a small delay (such as a delay of between 0 and 30 seconds), or recording broadcast content. For example, a method of this aspect may comprise or further comprise receiving second video content using a second tuner of the television receiver; and outputting an output signal corresponding to the second video content for displaying the second video content on a display device. Alternatively or additionally, a method of this aspect may comprise or further comprise receiving second video content using a second tuner of the television receiver; and recording the second video content to a local storage medium. Alternatively or additionally, a method of this aspect may comprise or further comprise receiving second video content using a second inactive tuner of the television receiver; obtaining second text data corresponding to audio of the second video content; evaluating the second text data to identify second frequencies of words appearing in the second text data; determining that a second keyword appears in the second text data with a second frequency greater than a second threshold frequency; and generating a second user interactive interface for display on a display device in real-time upon determining that the second frequency is greater than the second threshold frequency, such as a second user interactive interface that indicates a second match of the second keyword.

Optionally, the program suggestion aspects described herein may be activated or deactivated by a user, as desired. It will be appreciated that the program suggestion aspects may be referred to herein as a "scanning service," since the text data of the video content may be scanned in real-time to identify word matches for use in suggesting programming or content to a user or viewer. For example, a method of this aspect may comprise or further comprise generating an additional interface that includes an item for activating a scanning service using one or more inactive tuners of the television receiver; and receiving input corresponding to selection of the item for activating the scanning service. Alternatively or additionally, a method of this aspect may comprise or further comprise generating an additional interface that includes an item for deactivating a scanning service using one or more inactive tuners of the television receiver; receiving input corresponding to selection of the item for deactivating the scanning service; and stopping the scanning service. Optionally, stopping includes one or more of stopping receiving the video content using the inactive tuner of the television receiver; stopping obtaining text data corresponding to the audio portion of the video content; stopping evaluating the text data to identify frequencies of words appearing in the text data; and stopping determining that the first keyword appears in the text data with the first frequency greater than the first threshold frequency.

In another aspect, systems are provided. System of various embodiments provided herein may perform any of the above methods. For example, a system of this aspect may comprise one or more processors; a plurality of tuners communicatively coupled with the one or more processors; an audio-video output interface communicatively coupled with the one or more processors; and a non-transitory computer readable storage medium communicatively coupled with and readable by the one or more processors and having stored therein processor-readable instructions that, when executed by the one or more processors, cause the one or more processors to perform operations including: receiving video content using an inactive tuner of the plurality of tuners; obtaining text data corresponding to an audio portion of the video content; evaluating the text data to identify frequencies of words appearing in the text data; receiving input corresponding to determination of one or more user-designated keywords; storing the one or more user-designated keywords to a word list, such as a word list that includes at least a first keyword; determining that the first keyword appears in the text data with a first frequency greater than a first threshold frequency; and generating a first interface for output by the audio-video output interface for displaying on a display device in real-time upon determining that the first frequency is greater than the first threshold frequency, such as a first interface that includes a notification identifying a match of the first keyword.

Optionally, the inactive tuner corresponds to a tuner of the plurality of tuners that is not being actively used to display live video content on the display device. Optionally, the inactive tuner corresponds to a tuner of the television receiver that is not being actively used to record video content according to a recording schedule or timer.

Optionally, obtaining the text data includes decoding a closed caption portion of the video content to generate the text data. Optionally, obtaining the text data includes decoding a subtitle portion of the video content to generate the text data. Optionally, obtaining the text data includes retrieving the text data from a network location, such as an Internet server. Optionally, obtaining the text data includes processing the audio portion of the video content using a speech-to-text algorithm to generate the text data. Optionally, obtaining the text data includes rendering the video content with embedded closed captions or subtitles and generating the text data by performing character recognition on the embedded closed captions or subtitles.

Optionally, evaluating includes generating a database including one or more words in the text data and tracking appearances of the one or more words in the text data using the database. Optionally, the input corresponds to user entry of one or more user-designated keywords. Optionally, the input corresponds to selection of one or more user-designated keywords from a word list. Optionally, one or more keywords are added to the word list automatically and without user input. Optionally, the operations include or further include generating the word list. For example, generating the word list optionally includes monitoring recorded or watched text data corresponding to audio portions of at least one of video content recorded by the television receiver and video content output by the television receiver for immediate display on the display device; evaluating the recorded or watched text data to rank words appearing in the watched or recorded text data by frequency; and adding one or more words appearing in the recorded or watched text data having rankings greater than a threshold ranking to the word list.

Optionally, the first threshold frequency is user selectable. Optionally, the word list includes a second keyword. Optionally, the operations include or further include determining that the second keyword appears in the text data with a second frequency greater than a second threshold frequency, and generating the first interface includes generating the first interface in real-time upon determining that both the first frequency is greater than the first threshold frequency and the second frequency is greater than the second threshold frequency, such that the first interface includes the notification identifying a match of the first keyword, the second keyword, or both the first keyword and the second keyword. Optionally, the first threshold frequency corresponds to a specific number of appearances, as described above with reference to the disclosed methods. Optionally, the first threshold frequency corresponds to a specific number of appearances within a specific amount of time, as described above with reference to the disclosed methods.

Optionally, determining that the first keyword appears in the text data with the first frequency greater than the first threshold frequency includes comparing words appearing in the text data having frequencies greater than the first threshold frequency with the first keyword to determine the match. Optionally, determining that the first keyword appears in the text data with the first frequency greater than the first threshold frequency includes searching a database including one or more words in the text data using the first keyword to identify a number or frequency of appearances of the first keyword in the text data; and determining that the number or frequency of appearances of the first keyword in the text data is greater than the first threshold frequency.

Optionally, the first interface requests selection of a command, wherein the command corresponds to at least one of record the video content, immediately display the video content, or ignore the video content. Optionally, the operations include or further include receiving user input corresponding to determination of a command to record the video content, immediately display the video content, or ignore the video content. Optionally, the notification is overlayed on a graphical user interface, an electronic programming guide, or other video content being output for display on the display device.

Optionally, the operations include or further include receiving second video content using a second tuner of the television receiver; and outputting an output signal corresponding to the second video content for displaying the second video content on a display device. Optionally, the operations include or further include receiving second video content using a second tuner of the television receiver; and recording the second video content to a local storage medium. Optionally, the operations include or further include receiving second video content using a second inactive tuner of the television receiver; obtaining second text data corresponding to audio of the second video content; evaluating the second text data to identify second frequencies of words appearing in the second text data; determining that a second keyword appears in the second text data with a second frequency greater than a second threshold frequency; and generating a second user interactive interface for display on a display device in real-time upon determining that the second frequency is greater than the second threshold frequency, such as a second user interactive interface that indicates a second match of the second keyword.

Optionally, the operations include or further include generating a second interface that includes an item for activating a scanning service using one or more inactive tuners of the television receiver; and receiving, by the television receiver, input corresponding to selection of the item for activating the scanning service. Optionally, the operations include or further include generating, by the television receiver, a second interface that includes an item for deactivating a scanning service using one or more inactive tuners of the television receiver; receiving, by the television receiver, input corresponding to selection of the item for deactivating the scanning service; and stopping, by the television receiver, the scanning service. Optionally, stopping includes one or more of stopping receiving the video content using the inactive tuner of the television receiver; stopping obtaining text data corresponding to the audio portion of the video content; stopping evaluating the text data to identify frequencies of words appearing in the text data; and stopping determining that the first keyword appears in the text data with the first frequency greater than the first threshold frequency.

It will again be appreciated that the systems of this aspect may optionally perform any of the methods described above. For example, the instructions stored on the non-transitory computer readable medium, when executed by the one or more processors, may cause the one or more processors to perform any of the methods described above.

In another aspect, computer program products are provided. In some embodiments, a computer program product of this aspect may correspond to a computer program, stored on a non-transitory computer readable storage medium. The computer program may correspond to processor executable instructions for performing any of the methods described above. The computer program may be suitable for loading on and or execution by a system, such as a television receiver. A non-transitory computer readable storage medium of this aspect may comprise instructions that, when executed by one or more processors, cause the one or more processors to perform operations including: receiving video content using an inactive tuner of a television receiver; obtaining text data corresponding to an audio portion of the video content; evaluating the text data to identify frequencies of words appearing in the text data; receiving input corresponding to determination of one or more user-designated keywords; storing the one or more user-designated keywords to a word list, such as a word list that includes at least a first keyword; determining that the first keyword appears in the text data with a first frequency greater than a first threshold frequency; and generating a first interface for display on a display device in real-time upon determining that the first frequency is greater than the first threshold frequency, such as a first interface that includes a notification identifying a match of the first keyword.

Optionally, the television receiver includes a plurality of tuners, and the inactive tuner corresponds to one of the plurality of tuners. Optionally, the inactive tuner corresponds to a tuner of the television receiver that is not being actively used to display live video content on the display device. Optionally, the inactive tuner corresponds to a tuner of the television receiver that is not being actively used to record video content according to a recording schedule or timer.

Optionally, obtaining the text data includes decoding a closed caption portion of the video content to generate the text data. Optionally, obtaining the text data includes decoding a subtitle portion of the video content to generate the text data. Optionally, obtaining the text data includes retrieving the text data from a network location. Optionally, obtaining the text data includes processing the audio portion of the video content using a speech-to-text algorithm to generate the text data. Optionally, obtaining the text data includes rendering the video content with embedded closed captions or subtitles and generating the text data by performing character recognition on the embedded closed captions or subtitles.

Optionally, evaluating includes generating a database including one or more words in the text data and tracking appearances of the one or more words in the text data using the database. Optionally, the input corresponds to user entry of one or more user-designated keywords. Optionally, the input corresponds to selection of one or more user-designated keywords from a word list. Optionally, one or more keywords are automatically added to the word list without user input. Optionally, the operations include or further include generating the word list. Optionally, generating the word list includes monitoring recorded or watched text data corresponding to audio portions of at least one of video content recorded by the television receiver and video content output by the television receiver for immediate display on the display device; evaluating the recorded or watched text data to rank words appearing in the watched or recorded text data by frequency; and adding one or more words appearing in the recorded or watched text data having rankings greater than a threshold ranking to the word list.

Optionally, the first threshold frequency is user selectable. Optionally, the word list includes a second keyword. Optionally, the operations include or further include determining that the second keyword appears in the text data with a second frequency greater than a second threshold frequency. Optionally, generating the first interface includes generating the first interface in real-time upon determining that both the first frequency is greater than the first threshold frequency and the second frequency is greater than the second threshold frequency, such as where the first interface includes the notification identifying a match of the first keyword, the second keyword, or both the first keyword and the second keyword. Optionally, the first threshold frequency corresponds to a specific number of appearances, such as described above with reference to the disclosed methods. Optionally, the first threshold frequency corresponds to a specific number of appearances within a specific amount of time, such as described above with reference to the disclosed methods. Optionally, determining that the first keyword appears in the text data with the first frequency greater than the first threshold frequency includes comparing words appearing in the text data having frequencies greater than the first threshold frequency with the first keyword to determine the match. Optionally, determining that the first keyword appears in the text data with the first frequency greater than the first threshold frequency includes searching a database including one or more words in the text data using the first keyword to identify a number or frequency of appearances of the first keyword in the text data; and determining that the number or frequency of appearances of the first keyword in the text data is greater than the first threshold frequency.

Optionally, the first interface requests selection of a command, such as a command that corresponds to at least one of record the video content, immediately display the video content, or ignore the video content. Optionally, the operations include or further include: receiving user input corresponding to determination of a command to record the video content, immediately display the video content, or ignore the video content. Optionally, the notification is overlayed on a graphical user interface, an electronic programming guide, or other video content being output for display on the display device.

Optionally, the operations include or further include receiving second video content using a second tuner of the television receiver; and outputting an output signal corresponding to the second video content for displaying the second video content on a display device. Optionally, the operations include or further include receiving second video content using a second tuner of the television receiver; and recording the second video content to a local storage medium. Optionally, the operations include or further include receiving second video content using a second inactive tuner of the television receiver; obtaining second text data corresponding to audio of the second video content; evaluating the second text data to identify second frequencies of words appearing in the second text data; determining that a second keyword appears in the second text data with a second frequency greater than a second threshold frequency; and generating a second user interactive interface for display on a display device in real-time upon determining that the second frequency is greater than the second threshold frequency, such as a second user interactive interface that indicates a second match of the second keyword.

Optionally, the operations include or further include generating a second interface that includes an item for activating a scanning service using one or more inactive tuners of the television receiver; and receiving input corresponding to selection of the item for activating the scanning service. Optionally, the operations include or further include generating a second interface that includes an item for deactivating a scanning service using one or more inactive tuners of the television receiver; receiving input corresponding to selection of the item for deactivating the scanning service; and stopping the scanning service. Optionally, stopping includes one or more of stopping receiving the video content using the inactive tuner of the television receiver; stopping obtaining text data corresponding to the audio portion of the video content; stopping evaluating the text data to identify frequencies of words appearing in the text data; and stopping determining that the first keyword appears in the text data with the first frequency greater than the first threshold frequency.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

A further understanding of the nature and advantages of various embodiments, examples, and aspects may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In embodiments, the present invention provides systems, methods, and computer program products for suggesting television programs to a user by, for example, analyzing closed caption or subtitle content of unwatched or unrecorded video content to determine if the video content is of interest to the user. The user may indicate one or more keywords for use in the analysis and the analysis may scan the text of the closed caption or subtitle content to identify matches to the keywords. Beside user input keywords, the keywords may also be determined through analysis of video content watched or recorded by the user to determine frequently encountered words. These frequently encountered words may automatically be used in matching the text of the closed caption or subtitle content. The users may also or alternatively select particular words of the frequently encountered words to use for matching.

In addition to providing better program recommendations for users, embodiments described herein also allow users to fine tune the suggestion algorithm to allow for even higher quality suggestions. For example, the user may indicate a threshold number of match occurrences for a particular keyword. As another example, the user may indicate that multiple keywords must match before a notification is generated. In this way, the user may be able to optimize the suggestions made to the user to eliminate or reduce suggestions of programs that are not of interest to the user.

Figure 1:
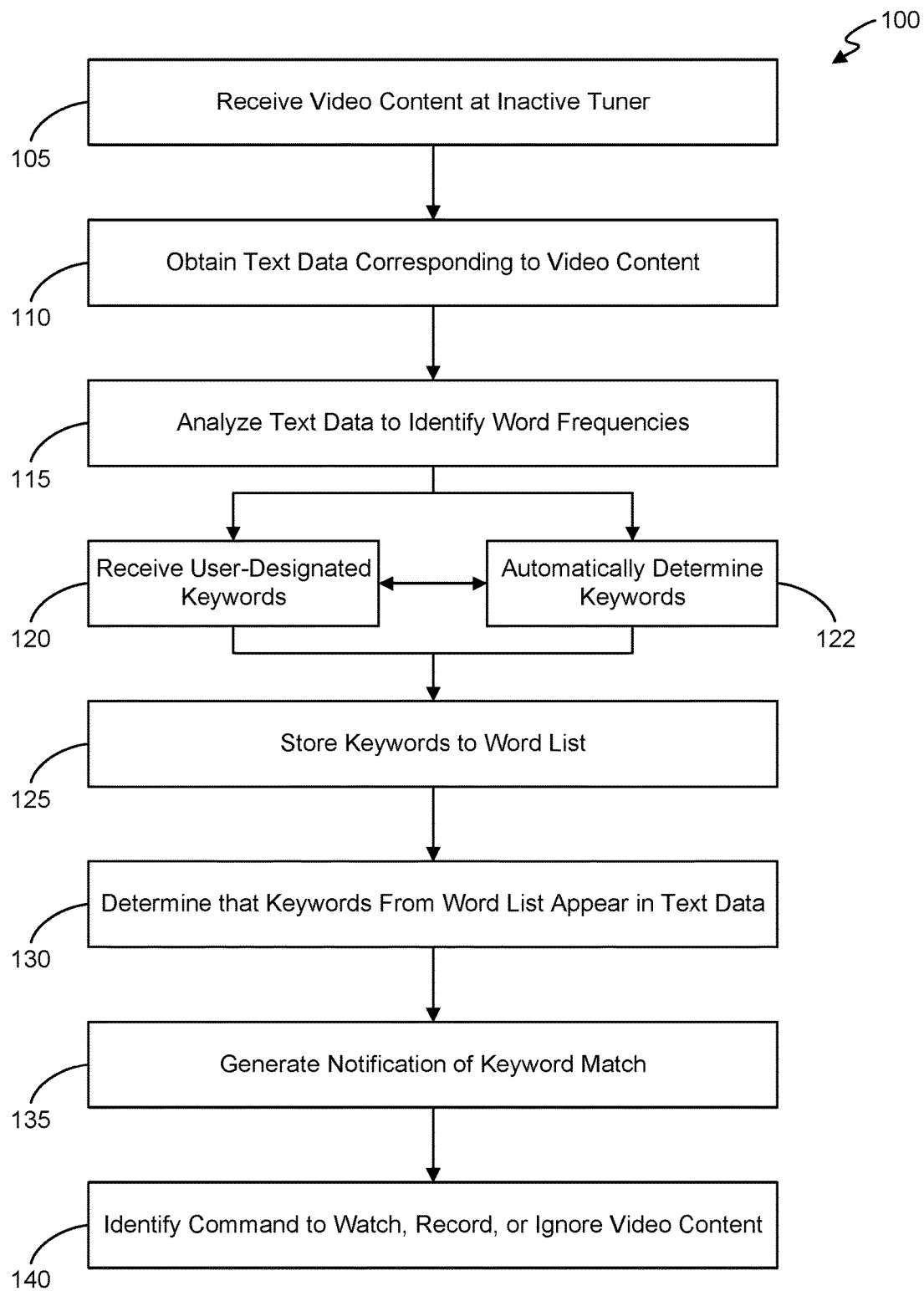
FIG. 1 provides an overview of an example method for generating programming suggestions.

FIG. 1 provides an overview of an example method 100 for providing program recommendations to a user. At block 105, video content is received at an inactive tuner. For example, one or more broadcast programs may be received at an inactive tuner, which may correspond to a transponder stream containing the one or more broadcast programs. The inactive tuners may correspond to unused tuners of a television receiver, such as tuners that are standing by idle, awaiting instructions for obtaining live video content for immediate display to a display device or for obtaining live video content and storing or recording the video content to a storage device for later playback to a display device. It will be appreciated that a television receiver may include many tuners, such as 1, 2, 3, 4, 5, 6, 7, 8, 9, 10, 11, 12, 13, 14, 15, 16, etc., and, at any one time, one or more of these tuners may not be actively used for viewing or recording video content and therefore remain available for other uses. Advantageously, these unused, inactive, or idle tuners may find a use according to the present disclosure, such as for making program recommendations to the user, by allowing for monitoring of text data included with the video content, such as in a closed caption or subtitle portion of the video content for unwatched and/or unrecorded channels in the background while the television receiver may optionally be displaying live content or recording content using active tuners.

At block 110, text data corresponding to the video content is obtained. The text data may be directly obtained from a closed caption or subtitle portion of the video content. It will be appreciated that the terms "closed caption" and "subtitle" are used interchangeably herein to refer to any of the various worldwide standards used for providing textual captions for audio portions of a video program. For example, various subtitle and/or closed caption streams may be integrated into video content of various formats. As one specific example, a closed caption feed may be integrated into an MPEG-2 stream according to the Consumer Electronics Association (CEA) 708 standard. As another example, a closed caption feed may be integrated into an analog NTSC transmission according to the Electronic Industries Alliance (EIA) 608 standard. Other implementations, such as teletext, may similarly be used. These closed caption streams may be suitably decoded using standard techniques to provide a feed of text data as the closed caption stream is received. It will be appreciated that the closed caption for the original language (e.g., English) or a secondary or translated language (e.g., Spanish), may be used for the analysis and program suggestion techniques disclosed herein.

At block 115, the text data is analyzed or evaluated to identify word frequencies. Optionally, one or more words in the text data are removed or are otherwise not counted during the analysis or evaluation of word frequencies. For example, prepositions, pronouns, articles, etc., may be removed or ignored to simplify the word frequency analysis and determination of useful words for identification of program suggestions. Other words may be removed or ignored as dictated by the user. As one example of the analysis of the text data for identification of frequencies of remaining words in the text data, each word may be subjected to a comparison to determine whether the word has been encountered previously and a count related to the word incremented each time the word is encountered. Such analysis may include creation of a database including entries for each word and/or an identifier associated with each word and a count associated with each word.

At block 120, one or more user-designated keywords may be received. The user-designated keywords may be user input or selected to correspond to words associated with user interests. At block 122, one or more keywords may be automatically or dynamically determined, such as without user input. For example, programs displayed or recorded may undergo a similar analysis as occurs at block 115 to identify a frequency of words in the displayed or recorded programs and one or more of the most frequent words may be automatically added to the word list. Optionally, the user may select one or more of the words from the displayed or recorded programs to add to the word list.

At block 125, the keywords are stored to a word list, which may correspond to a database, text file, or other suitable storage type for keeping track of keywords relating to programs of interest to the user. It will be appreciated that the user may also manually edit and add words to or eliminate words from the word list, such as by using a graphical user interface of a television receiver and providing suitable input, such as text entry, item selection and deletion. Optionally, language tools may be made available, such as a dictionary or thesaurus, to allow a user to expand, correct, or update a word list, such as to include synonyms, correct spelling mistakes, etc. Optionally, synonyms, plurals, singulars, etc., may be automatically added to and stored to the word list, and this option may be user activated or deactivated.

At block 130, it is determined that one or more keywords from the word list appear in the text data. This may occur by comparing each word in the text data with the keywords in the word list to track the number of occurrences of various keywords in the text data. Optionally, use of a database containing the word list may facilitate and expedite the determination. For example, a database containing the keywords may be queried using each word in the text data. If the text data is analyzed to determine the frequency of the words in the text data, the determination may use those words having a frequency greater than a threshold frequency to identify matches. This latter option may conserve computing resources and/or expedite the determination by not analyzing words having a number of occurrences in the text data less than the threshold.

At block 135, a notification of the keyword match is generated. The notification may be by any of various mechanisms, such as generating an interface for output by a display, generating an overlay on a video or electronic program guide, displaying an indicator or icon on an interface, or transmitting a message to a user device, such as by email or text message or an application notification. The notification may indicate one or more of the keyword or keywords that match, the number of occurrences of the keyword or keywords, the channel the match was identified on, the program the match was identified in, a time the match was identified, the occurrence threshold (if any).

The notification may also include a query for user instructions, such as a request to watch or display the video content the match was identified in, to record the video content the match was identified in, or to ignore the video content the match was identified in. Optionally, the query may allow or request that a user flag or otherwise store details about the video content the match was identified in, such as program name, broadcast time, broadcast channel, etc., which may facilitate the user keeping track of programs that may be related to various keywords, or facilitate the user watching or recording the video content at a later broadcast time.

At block 140, a command may be identified corresponding to an action for a television receiver to take in response to detecting a keyword match. Example commands include a command to watch the video content, to record the video content, or to ignore the video content. Optionally, a command to flag the video content, as described above, may be identified. The command may correspond to user input received by a television receiver, such as by way of a remote control or other user input device Referring now to FIG. 2, an example media content distribution system 200 is shown in which aspects of the present disclosure may be implemented. For brevity, the system 200 is depicted in a simplified and conceptual form, and may generally include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of media or content distribution system. Although the depicted system 200 identifies a satellite based content distribution system, the invention may be implemented and/or used with any type of television or video distribution system, such as cable, terrestrial/over the air, IPTV, over-the-top, on demand, subscription-based, network-based, etc. Optionally, the depicted system 200 may be used with a digital video recorder (DVR) system, where content received from a television or video distribution system is recorded for later playback.

The example system 200 may include a service provider 202, a satellite uplink 204, a plurality of orbiting (e.g., geosynchronous) satellites 206a, 206b, 206c, a satellite dish 208, a primary television receiver 210, a plurality of secondary television receivers 212a, 212b, and a plurality of televisions 214a, 214b, 214c, 214d. The system 200 may also include at least one network 220 that establishes a bi-directional communication path for data transfer between and among any of the primary television receiver 210, secondary television receivers 212a-b, and televisions 214a-d. Optionally, one or more of television receiver 210 and secondary television receivers 212a-b may be directly or indirectly connected or wired to satellite dish 208 for receiving broadcast content.

In some embodiments, the network 220 may further establish a bi-directional communication path for data transfer between the primary television receiver 210 and the service provider 202. The network 220 is intended to represent any number of terrestrial and/or non-terrestrial network features or elements. For example, the network 220 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 200.

The primary television receiver 210, and the secondary television receivers 212a-b, as described throughout may generally be any type of television receiver, such as a set top box or TV dongle, for example. In another example, the primary television receiver 210, and the secondary television receivers 212a-b, may exhibit functionality integrated as part of or into a television, monitor, a digital video recorder (DVR), a computing device, such as a tablet computing device, or any other computing system or device, as well as variations thereof. Optionally, the primary television receiver 210, and the secondary television receivers 212a-b, may exhibit functionality integrated as part of or into a software application, which may be particularly useful in IPTV or over-the-top systems, where the physical infrastructure of the service provider uplink, downlink, and satellites are not required and all video programming may be transmitted from service provider 202 to the primary television receiver 210 and/or the secondary television receivers 212a-b via network 220. It will be appreciated that the primary television receiver 210 and the network 220, together with the secondary television receivers 212a-b, and televisions 214a-d may form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In practice, the satellites 206a-c may be configured to receive uplink signals 222a, 222b from the satellite uplink 204. In this example, the uplink signals 222a-b may contain one or more transponder streams of particular data or content, such as content streams, like particular television channels, broadcast content, video content, or other data feeds, that is supplied by the service provider 202. For example, each of the respective uplink signals 222a-b may contain various media content such a plurality of encoded HD (High Definition) television channels, various SD (Standard Definition) television channels, video content, audio programming, on-demand programming, programming information, advertisements, and/or any other content in the form of at least one transponder stream, and in accordance with an allotted carrier frequency and bandwidth. In this example, different media content may be carried using different ones of the satellites 206a-c. Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, etc.

The satellites 206a-c may further be configured to relay the uplink signals 222a-b to the satellite dish 208 as downlink signals 224a, 224b. Similar to the uplink signals 222a-b, each of the downlink signals 224a-b may contain one or more transponder streams of particular data or content, such as various encoded and/or at least partially electronically scrambled television channels, advertisements, video content, on-demand programming, etc., in accordance with an allotted carrier frequency and bandwidth. The downlink signals 224a-b, however, may not necessarily contain the same or similar content as a corresponding one of the uplink signals 222a-b. For example, the uplink signal 222a may include a first transponder stream containing at least a first group or grouping of television channels, and the downlink signal 224a may include a second transponder stream containing at least a second, different group or grouping of television channels. In other examples, the first and second group of television channels may have one or more television channels in common. In sum, there may be varying degrees of correlation between the uplink signals 222a-b and the downlink signals 224a-b, both in terms of content and underlying characteristics.

Continuing with the example implementation scenario, the satellite dish 208 may be provided for use to receive one or more content streams, for example live, prerecorded or on-demand television programming or other video content, such as on a subscription basis, provided by the service provider 202, satellite uplink 204, and/or satellites 206a-c. For example, the satellite dish 208 may be configured to receive particular transponder streams, or downlink signals 224a-b, from one or more of the satellites 206a-c. Based on the characteristics of the primary television receiver 210 and/or satellite dish 208, however, it may only be possible to capture transponder streams from a limited number of transponders concurrently. For example, a tuner of the primary television receiver 210 may only be able to tune to a single transponder stream from a transponder of a single satellite, such as satellite 206a, at a time. In certain embodiments, however, a tuner of primary television receiver 210 may be able to simultaneously receive multiple transponder streams.

Additionally, the primary television receiver 210, which is communicatively coupled to the satellite dish 208, may subsequently select a content stream via a tuner, decode, and relay particular transponder streams to the television 214c or 214d for display thereon. For example, the satellite dish 208 and the primary television receiver 210 may, respectively, be configured to receive, decode, and relay at least one premium high definition (HD) formatted television channel to one or both of televisions 214c-d. Programming or content associated with the HD channel may generally be presented "live," or from a recording as previously stored on, by, or at the primary television receiver 210. In this example, the HD channel may be output to the televisions 214c-d in accordance with the HDMI/HDCP content protection technologies. Other embodiments are possible. For example, in some embodiments, the HD channel may be output to the televisions 214c-d in accordance with the MoCA® (Multimedia over Coax Alliance) home entertainment networking standard. Still other embodiments are possible.

Further, the primary television receiver 210 may select, via one or more tuners, decode, and relay particular transponder streams to one or both of the secondary television receivers 212a-b, which may in turn relay particular transponder streams to a corresponding one of the television 214a and the television 214a for display thereon. For example, the satellite dish 208 and the primary television receiver 210 may, respectively, be configured to receive, decode, and relay at least one television channel to the television 214a by way of the secondary television receiver 212a. Similar to the above-example, the television channel may generally be presented "live," or from a recording as previously stored on the primary television receiver 210, and may be output to the television 214a by way of the secondary television receiver 212a in accordance with a particular content protection technology and/or networking standard. Other embodiments are possible.

In various embodiments, input commands may be received by primary television receiver 210 or secondary television receivers 212a-b, such as for selection of programming for display on televisions 214a-d. Input commands may be received from one or more input devices connected to network 220 or one or more input devices directly or wirelessly connected to primary television receiver 210 or secondary television receivers 212a-b. For example, an input device may exemplified as a remote control, a keyboard, a mouse, a smartphone, a touchpad, etc.

Figure 3:
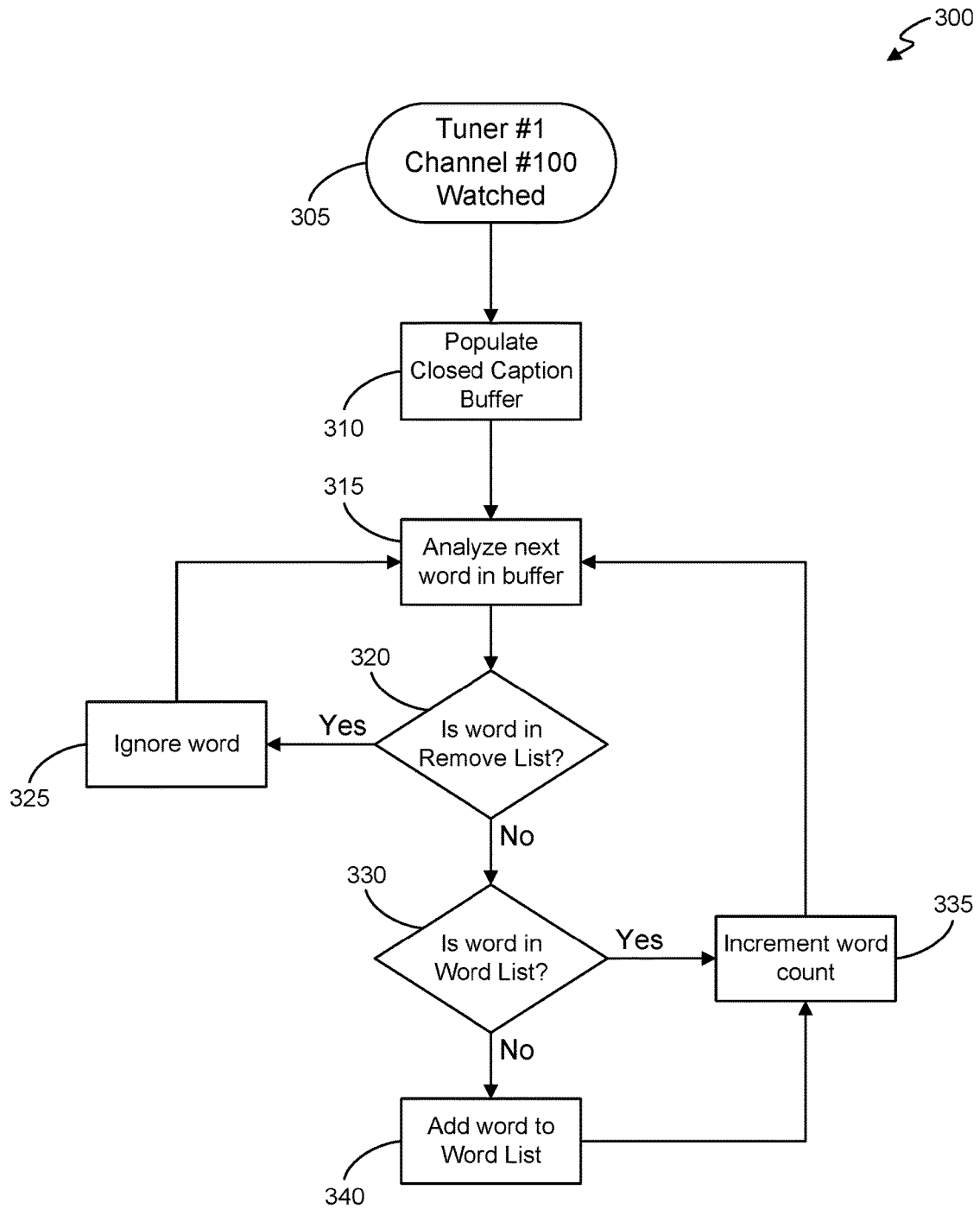
FIG. 3 provides an overview of an example method for generating a word list.

FIG. 3 provides an overview of an example method 300 for generating a word list. In FIG. 3, at block 305, Tuner #1 is tuned to channel #100 for immediate display on a display device. Channel #100 may correspond to a channel being watched by a user. In some embodiments, it may be assumed that if a channel is manually tuned to a particular program or channel, that program or channel may be of interest to the user and so may be used for automatically populating a word list. It will be appreciated that the frequency of words in a program of interest may be useful to track, as words that appear more frequently in a program may indicate a subject or content of the program.

At block 310, a buffer is populated with the text data from a closed caption stream associated with the watched channel or program. The buffer may be contained in a memory, such as a random access memory, for use in analysis. Alternatively or additionally, the buffer may be stored to a storage medium, such as a non-transitory computer readable storage medium.

At block 315, a next word in the buffer is analyzed. In this way, each word in the text data can be analyzed sequentially as the word is received. Optionally, words can be analyzed in groups of 2 or more than 2, such as to better analyze compound words, hyphenated words, or otherwise related words.

At block 320, a word undergoing analysis is subjected to a determination of whether the word appears in a remove list. As described above, a remove list may include words of relative unimportance, such as articles, conjunctions, prepositions, pronouns, and other user defined words. The determination may include a comparison of the word with each word in the remove list. Alternatively or additionally, the determination may correspond to querying a database including the words in the remove list to determine whether the word undergoing analysis appears in the remove list. If the word undergoing analysis appears in the remove list, the word may be ignored, at block 325, and the process returns to block 315 for continued processing of additional words in the text data from the closed caption buffer.

If the word undergoing analysis does not appear in the remove list, the word may undergo additional analysis at block 330. At block 330, the word is subjected to a determination of whether the word already appears in the word list. The determination may include a comparison of the word with each word already in the word list. Alternatively or additionally, the determination may correspond to querying a database including the words in the word list to determine whether the word undergoing analysis appears in the word list already. If the word already appears in the word list, the count associated with the word is simply incremented at block 335. If the word undergoing analysis does not appear in the word list already, it is added to the word list at block 340 and a count associated with the word is incremented at block 335. After the count is incremented at block 335, the process returns to block 315 for continued processing of additional words in the text data from the closed caption buffer.

Figure 4:
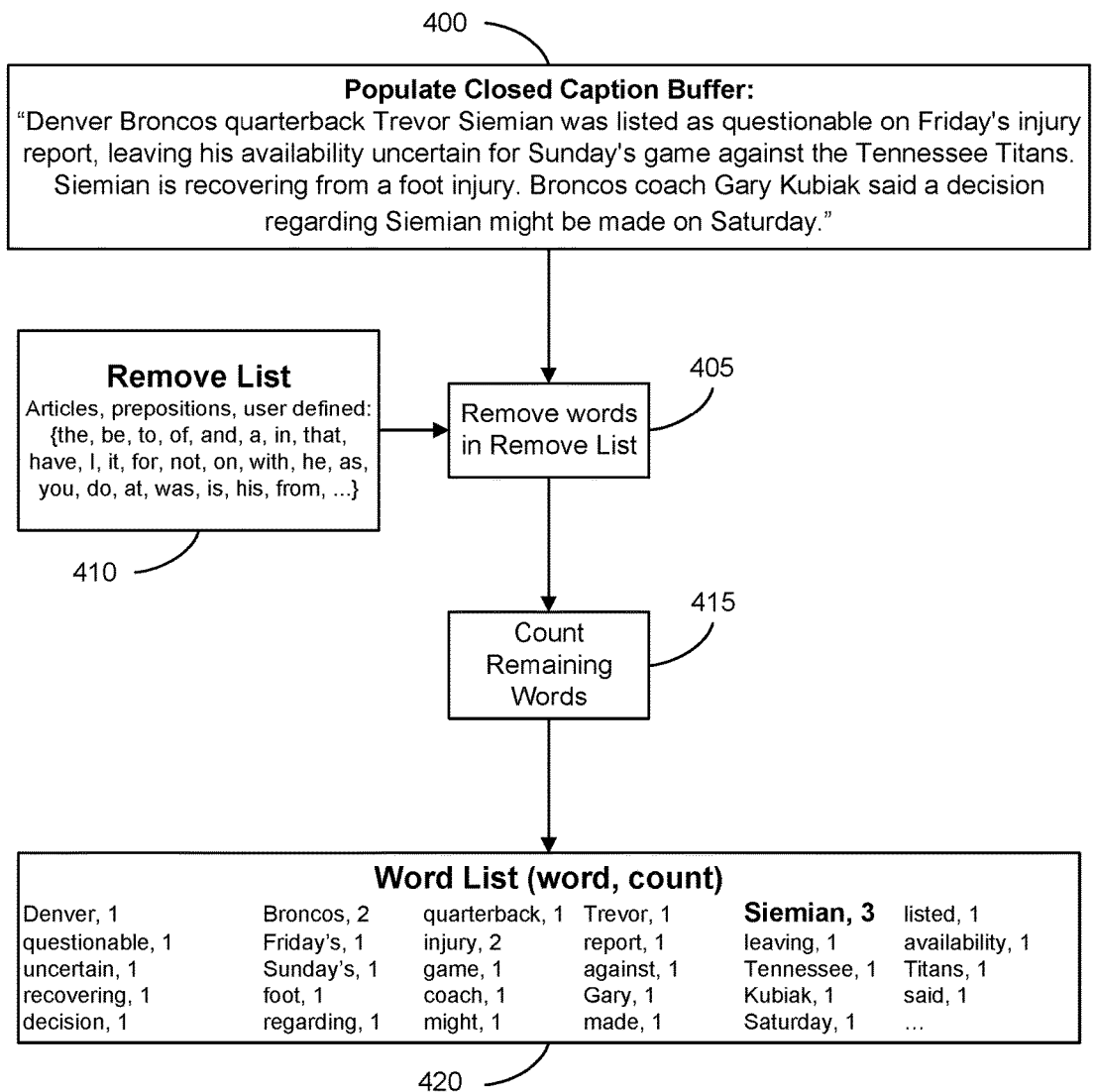
FIG. 4 provides an overview of the generation of an example word list.

An example of the processing of text data from a closed caption stream is illustrated in FIG. 4. Element 400 identifies text data used to populate a closed caption buffer. Each word in the closed caption buffer is processed in turn at block 405 to remove words from the remove list, identified at element 410. The remaining words are processed in turn at block 415 to identify a count or frequency of the words. The resultant word list is shown at element 420, and indicates that the most common word from the text data is "Siemian," which appears three times.

Figure 5:
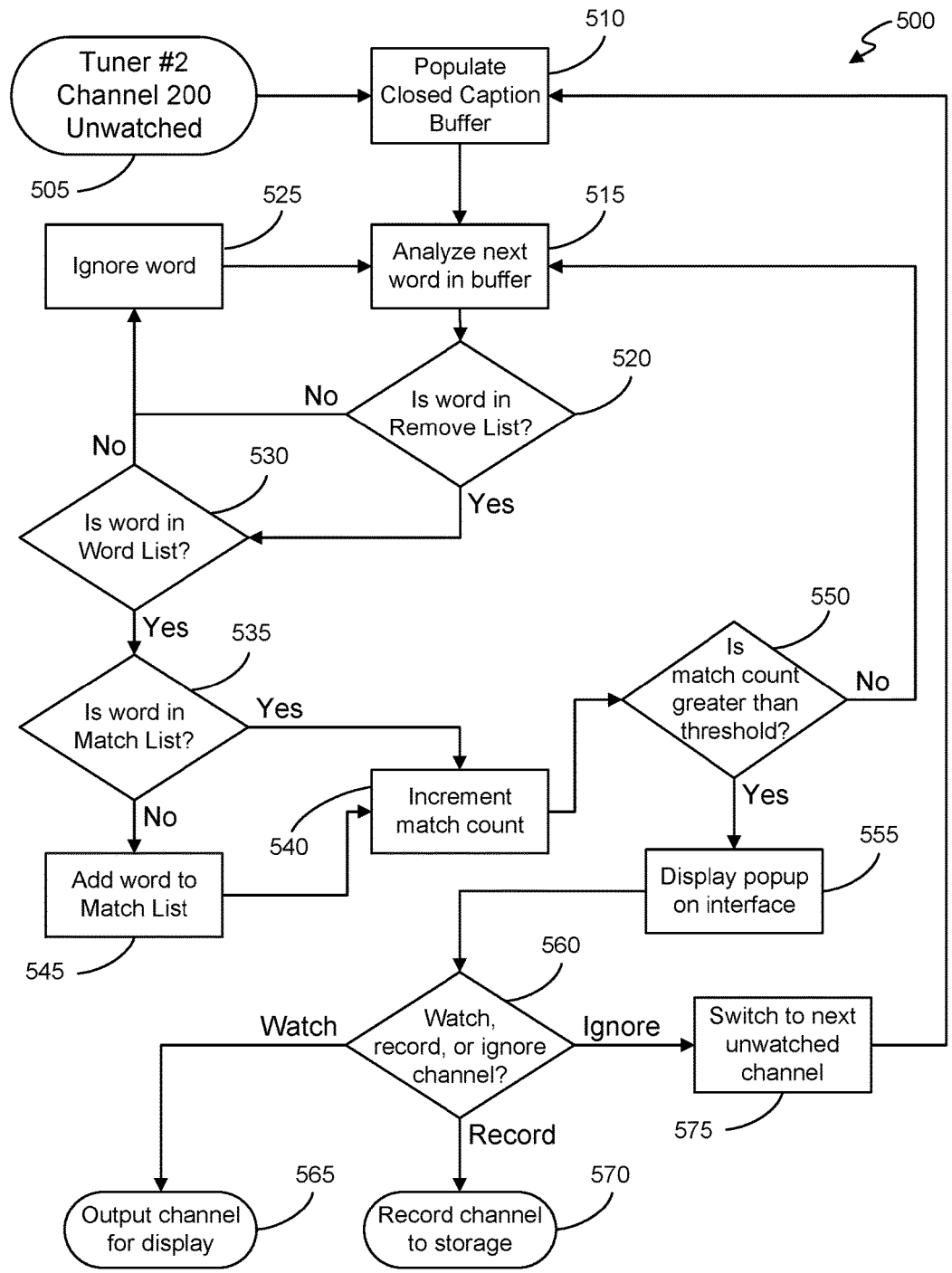
FIG. 5 provides an overview of an example method for generating programming suggestions.

FIG. 5 provides an overview of an example method 500 for analyzing text data using an inactive tuner. In FIG. 5, at block 505, Tuner #2 is tuned to channel #200 for determining whether to suggest the program broadcast on this channel to the user. Channel #200 may correspond to a channel or program that is not being watched or recorded. At block 510, a buffer is populated with the text data from a closed caption stream associated with the channel or program. The buffer may be contained in a memory, such as a random access memory, for use in analysis. Alternatively or additionally, the buffer may be stored to a storage medium, such as a non-transitory computer readable storage medium.

At block 515, a next word in the buffer is analyzed. In this way, each word in the text data can be analyzed sequentially as the word is received. Optionally, words can be analyzed in groups of 2 or more than 2, such as to better analyze compound words, hyphenated words, or otherwise related words.

At block 520, a word undergoing analysis is subjected to a determination of whether the word appears in a remove list. The determination may include a comparison of the word with each word in the remove list. Alternatively or additionally, the determination may correspond to querying a database including the words in the remove list to determine whether the word undergoing analysis appears in the remove list. If the word undergoing analysis appears in the remove list, the word may be ignored, at block 525, and the process returns to block 515 for continued processing of additional words in the text data from the closed caption buffer.

If the word undergoing analysis does not appear in the remove list, the word may undergo additional analysis at block 530. At block 530, the word is subjected to a determination of whether the word appears in the word list and thus matches a keyword. The determination may include a comparison of the word with each word in the word list. Alternatively or additionally, the determination may correspond to querying a database including the words in the word list to determine whether the word undergoing analysis appears in the word list. If the word undergoing analysis does not appear in the word list, the word may be ignored, at block 525, and the process returns to block 515 for continued processing of additional words in the text data from the closed caption buffer.

If the word already appears in the word list, the word may undergo additional analysis at block 550. At block 535, the word is subjected to a determination of whether the word already appears in a match list. The determination may include a comparison of the word with each word already in the match list. Alternatively or additionally, the determination may correspond to querying a database including the words in the match list to determine whether the word undergoing analysis appears in the match list already. If the word already appears in the match list, the match count associated with the word is incremented at block 540. If the word undergoing analysis does not appear in the match list already, it is added to the match list at block 545 and a match count associated with the word is incremented at block 540. After the count is incremented at block 540, the process continues to block 550 for continued processing.

At 550, the match count is analyzed to determine whether it is greater than, or greater than or equal to, the threshold frequency. If the match count is less than the threshold frequency, the process returns to block 515 for continued processing of additional words in the text data from the closed caption buffer.

If the match count is greater than, or equal to, the threshold frequency, the process proceeds to block 555, where a popup is displayed on an interface, such as a graphical interface of a television receiver. The popup may provide a notification of the match or the match count exceeding the threshold, and may indicate a suggested program that the user may find of interest. The popup may query the user for input at 560, such as to request instructions whether to watch the channel or program, to record the channel or program, or to ignore the channel or program. If input is detected corresponding to a command to watch the channel or program, the channel or program is output for display at 565. If input is detected corresponding to a command to record the channel or program, the channel or program is recorded to storage at 570. If input is detected corresponding to a command to ignore the channel or program, the tuner may be tuned to the next unwatched channel at 575 and the process returns to block 510 for continued processing of additional words in the text data from the closed caption buffer. Alternatively or additionally, the query may request instructions regarding the match and the ignore command may cause only the match to be ignored so that the process returns to block 515 for continued processing of additional words in the text data from the closed caption buffer, such as to allow other matches to be found.

Figure 6:
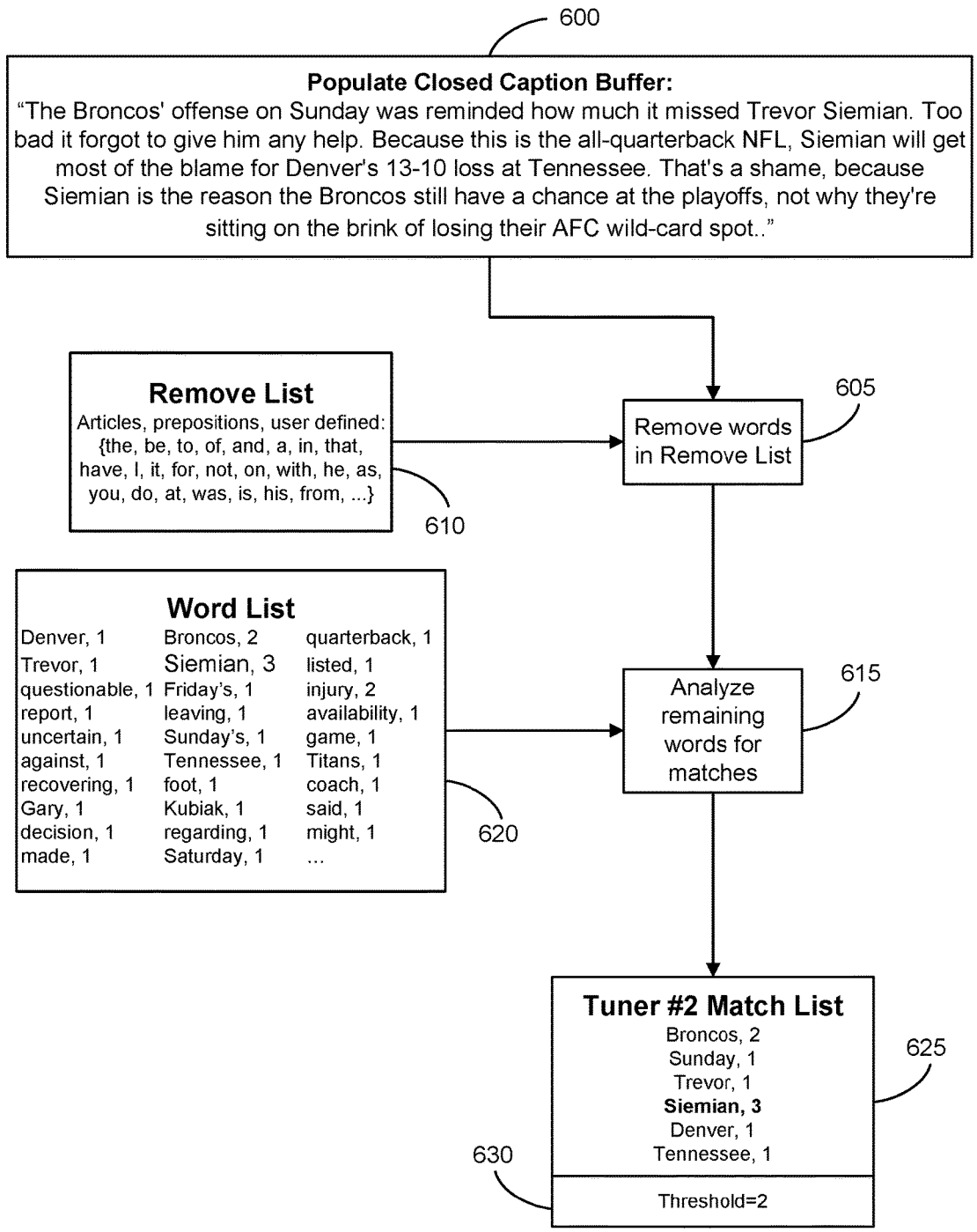
FIG. 6 provides an overview of analysis of text data for matches.

An example of the processing of text data from a closed caption stream for matches with keyword in a word list is illustrated in FIG. 6. Element 600 identifies text data used to populate a closed caption buffer. Each word in the closed caption buffer is processed in turn at block 605 to remove words from the remove list, identified at element 610. The remaining words are processed in turn at block 615 to identify matches with keywords in the word list, shown at 620. The resultant match list is shown at element 625, and indicates that the word from the text data "Siemian" matches three times, and is thus greater than the threshold match count, identified at 630 as two.

Figure 7A:
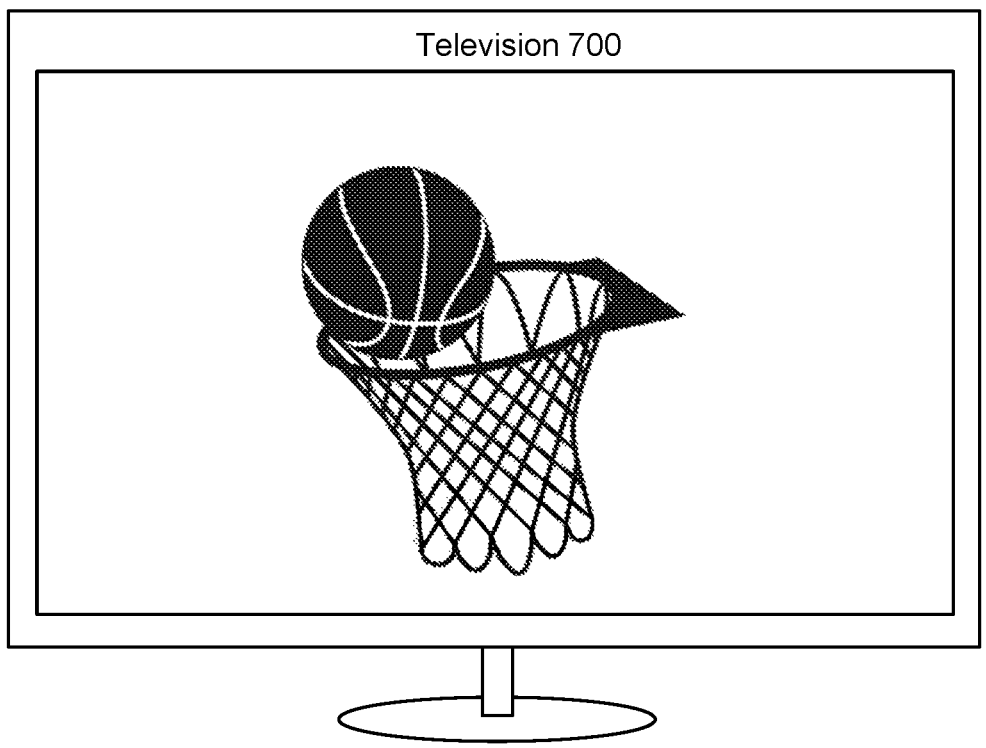
FIG. 7A and FIG. 7B provide example receiver interfaces.
Figure 7B:
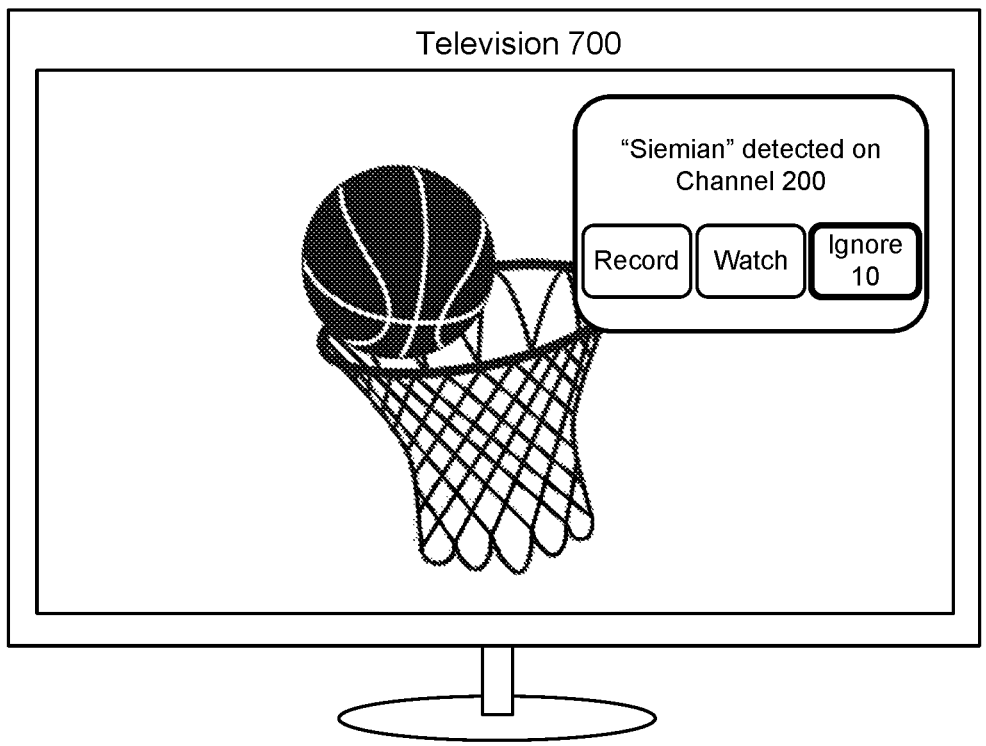

FIG. 7A shows an example receiver interface, which corresponds to a video content of a basketball game being displayed on a television 700. FIG. 7B shows an example receiver interface where a popup 705 is displayed, such as upon detecting the match of the word "Siemian" indicated in FIG. 6. The popup 705 includes a query for input for the user to select from among options, such as options to record, watch, or ignore the program detected as matching the keyword on channel #200. A user selectable default may be established to select a particular action when no instructions are received within a particular time. The particular time may also be user selectable. In FIG. 7B, the "Ignore" option is identified as the default, and a countdown timer is optionally shown on the option, indicating that if no action is taken within 10 seconds, the ignore option may be selected.

Figure 8:
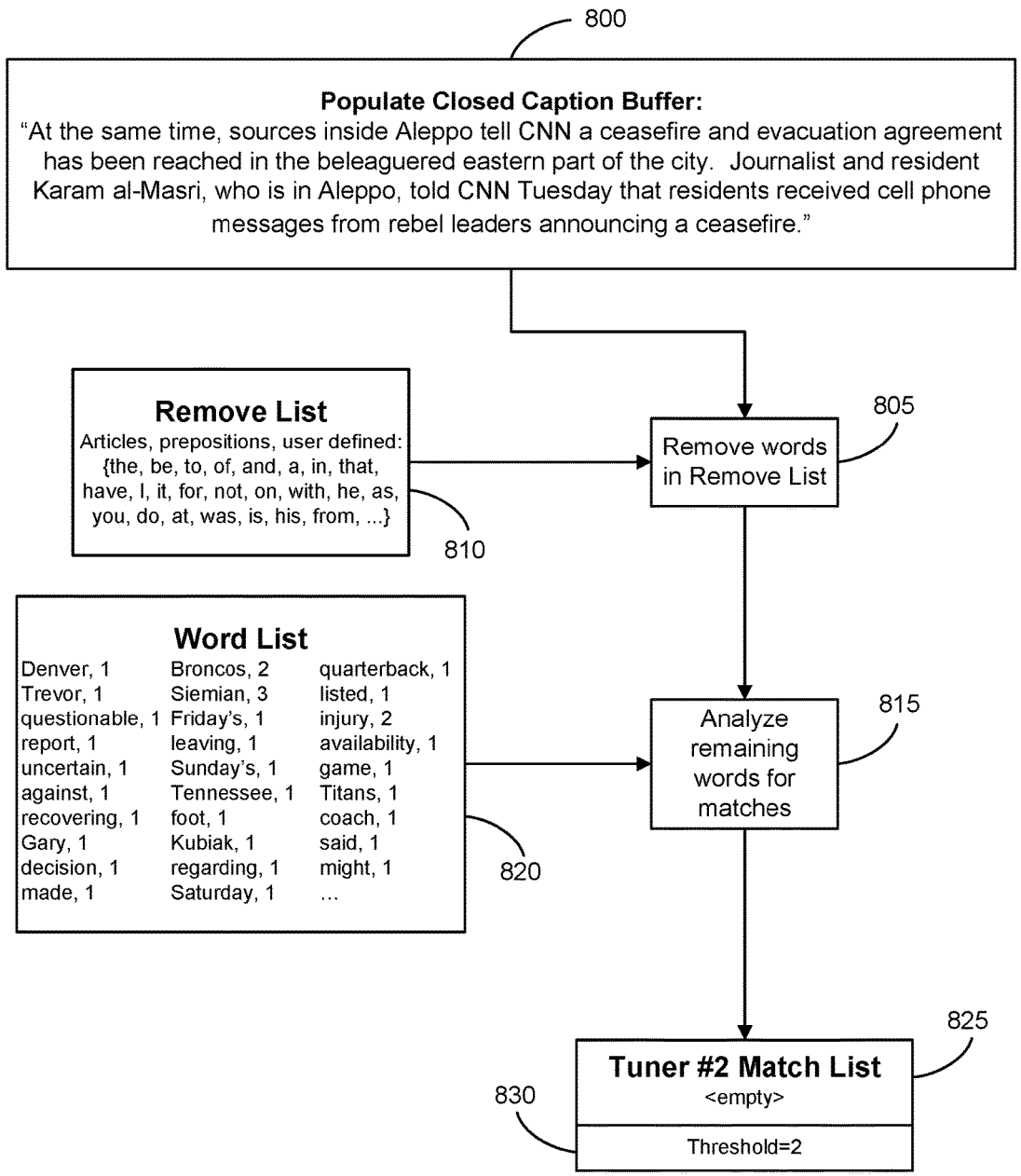
FIG. 8 provides an overview of analysis of text data for matches.

Another example of the processing of text data from a closed caption stream for matches with keyword in a word list is illustrated in FIG. 8. Element 800 identifies text data used to populate a closed caption buffer. Each word in the closed caption buffer is processed in turn at block 805 to remove words from the remove list, identified at element 810. The remaining words are processed in turn at block 815 to identify matches with keywords in the word list, shown at 820 and compare match counts with the threshold value 830. The resultant match list is shown at element 825, and indicates that none of the keywords in the word list match the text data, so the match list is empty.

Figure 9:
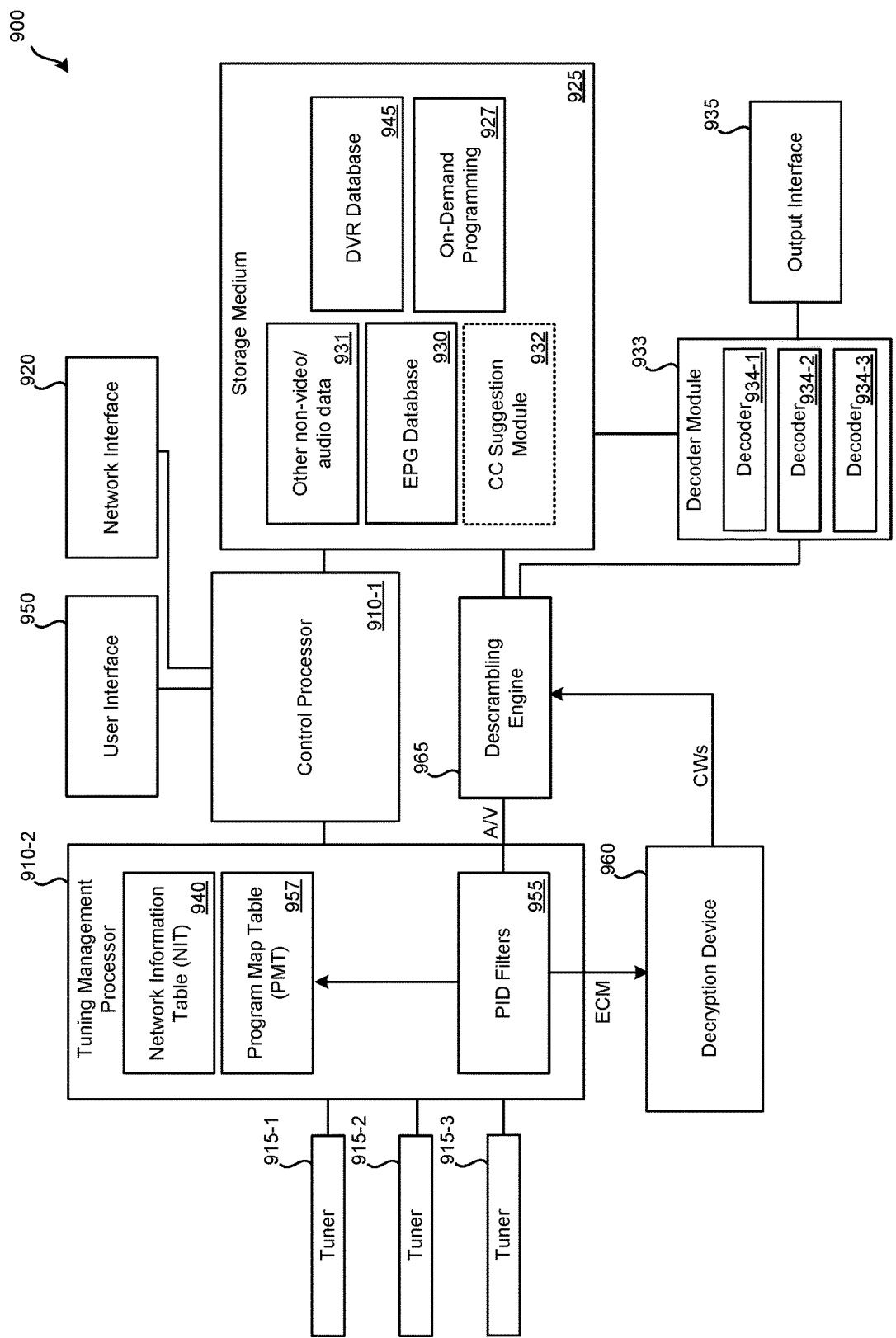
FIG. 9 provides a block diagram illustration of a receiver incorporating program suggestion features.

FIG. 9 illustrates an embodiment of a receiver 900 that makes use of a closed caption suggestion module. Embodiments of receiver 900 may include set top boxes (STBs), television receivers, and over-the-top receivers. As previously noted, in addition to being in the form of a STB, a receiver may be incorporated as part of another device, such as a television or other form of display device, such as a computer, smartphone, tablet, or other handheld portable electronic device. For example, a television may have an integrated receiver (which does not involve an external STB being coupled with the television).

Figure 2:
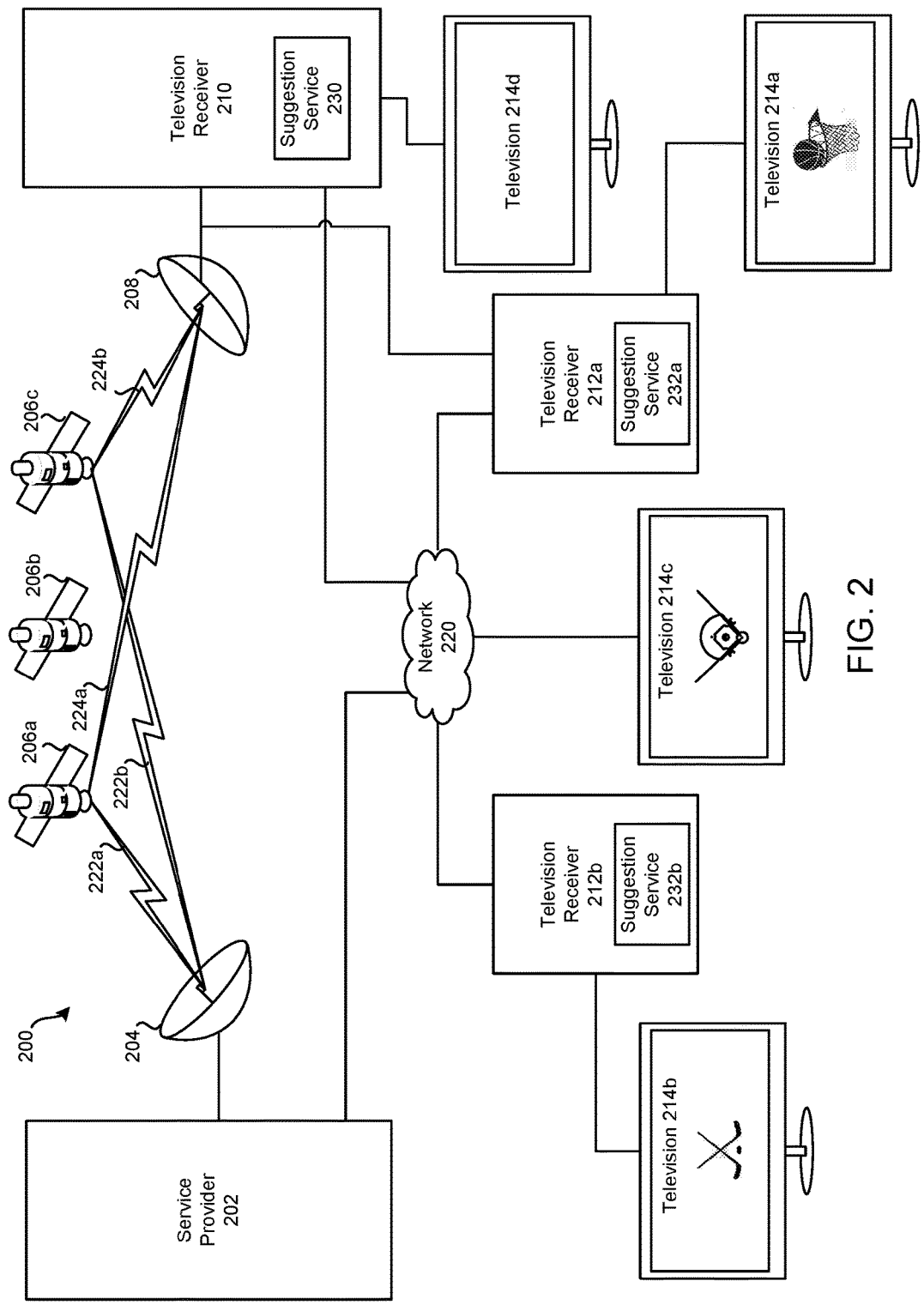
FIG. 2 illustrates an example of a satellite television distribution system.

Receiver 900 may represent any one or more of receivers 210 and 212a-212b of FIG. 2 and may be in the form of a STB that communicates with a display device such as a television. Receiver 900 may be incorporated as part of a television, such as televisions 214a-214d of FIG. 2 or television 700 of FIGS. 7A-7B, etc. Receiver 900 may include: processors 910 (which may include control processor 910-1, tuning management processor 910-2, and possibly additional processors), tuners 915, network interface 920, non-transitory computer-readable storage medium 925, electronic programming guide (EPG) database 930, networking information table (NIT) 940, digital video recorder (DVR) database 945 (which may include provider-managed television programming storage and/or user-defined television programming), on-demand programming 927, closed caption (CC) suggestion module 932, commercial database 946, user interface 950, decryption device 960, decoder module 933, interface 935, and/or descrambling engine 965. In various embodiments of receiver 900, fewer or greater numbers of components may be present. It should be understood that the various components of receiver 900 may be implemented using hardware, firmware, software, and/or some combination thereof. Functionality of components may be combined; for example, functions of descrambling engine 965 may be performed by tuning management processor 910-2. Further, functionality of components may be spread among additional components; for example, PID filters 955 may be handled by separate hardware from program map table 957. Receiver 900 may be in data communication with accessibility system 951, such as by way of network interface 920.

Processors 910 may include those configured to perform processes such as tuning to a particular channel, accessing and displaying EPG information from EPG database 930, and/or receiving and processing input from a user. For example, processors 910 may include one or more processors dedicated to decoding video signals from a particular format, such as MPEG, for output and display on a television and for performing decryption, if required. It should be understood that the functions performed by various modules of FIG. 9 may be performed using one or more processors. As such, for example, functions of descrambling engine 965 may be performed by control processor 910-1.

Control processor 910-1 may communicate with tuning management processor 910-2. Control processor 910-1 may control the recording of television channels based on timers stored in DVR database 945. Control processor 910-1 may also provide commands to tuning management processor 910-2 when recording of a television channel is to cease. In addition to providing commands relating to the recording of television channels, control processor 910-1 may provide commands to tuning management processor 910-2 that indicate television channels to be output to decoder module 933 for output to a display device. Control processor 910-1 may also communicate with network interface 920 and user interface 950. Control processor 910-1 may handle incoming data from network interface 920, including network transport streams received from over-the-top service providers. Control processor 910-1 may handle incoming data from network interface 920, including network transport streams received from user interface 950, which may include user input received by way of one or more human interface devices. Additionally, control processor 910-1 may be configured to output data via network interface 920. Control processor 910 may also be configured to perform image and audio analysis, such as to identify contextual aspects present in an audio or video stream, for example facial recognition or voice recognition.

Tuners 915 may include one or more tuners used to tune to transponders that include broadcasts of one or more television channels that may be received from a satellite or cable system, for example. In the illustrated embodiment of receiver 900, three tuners are present (tuner 915-1, tuner 915-2, and tuner 915-3). In other embodiments, two or more than three tuners may be present, such as four, six, eight, or sixteen tuners. Each tuner contained in tuners 915 may be capable of receiving and processing a single transponder stream from a satellite transponder at a given time, for example. As such, a single tuner may tune to a single transponder stream at a given time. If tuners 915 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 915 may be used to receive the signal containing the multiple television channels for presentation and/or recording. Tuners 915 may receive commands from tuning management processor 910-2. Such commands may instruct tuners 915 which frequencies are to be used for tuning.

Network interface 920 may be used to communicate via an alternate communication channel with a television service provider, if such communication channel is available. The primary communication channel may be via satellite (which may be unidirectional to receiver 900) and the alternate communication channel (which may be bidirectional) may be via a network, such as the Internet. Referring back to FIG. 2, receiver 210 may be able to communicate with television service provider system 202 via a network 220, such as the Internet. This communication may be bidirectional: data may be transmitted from receiver 210 to television service provider system 202 and from television service provider system 202 to receiver 210. Referring back to FIG. 9, network interface 920 may be configured to communicate via one or more networks, such as the Internet, to communicate with television service provider system 202 of FIG. 2.

Other information may be transmitted and/or received via network interface 920. For example, commands, data, user input, etc. may be transmitted to control processor 910-1. For example, user input data received at a computer system or smartphone may be transmitted to receiver 900 by way of network interface 920.

Storage medium 925 may represent one or more non-transitory computer-readable storage mediums. Storage medium 925 may include memory and/or a hard drive. Storage medium 925 may be used to store information received from one or more satellites and/or information received via network interface 920. Storage medium 925 may store information related to EPG database 930, CC suggestion module 932 and related preferences, other non-video/audio data 931, DVR database 945, commercial database 946, and/or on-demand programming 927. Recorded television programs may be stored using storage medium 925 as part of DVR database 945. Storage medium 925 may be partitioned or otherwise divided (such as into folders) such that predefined amounts of storage medium 925 are devoted to storage of television programs recorded due to user-defined timers and stored television programs recorded due to provider-defined timers.

EPG database 930 may store information related to television channels and the timing of programs appearing on such television channels. EPG database 930 may be stored using storage medium 925, which may be a hard drive. Information from EPG database 930 may be used to inform users of what television channels or programs are popular and/or provide recommendations to the user. Information from EPG database 930 may provide the user with a visual interface displayed by a television that allows a user to browse and select television channels and/or television programs for viewing and/or recording. Information used to populate EPG database 930 may be received via network interface 920 and/or via satellites, such as satellite 130 of FIG. 1 via tuners 915. For instance, updates to EPG database 930 may be received periodically via satellite. EPG database 930 may serve as an interface for a user to control DVR functions of receiver 900, and/or to enable viewing and/or recording of multiple television channels simultaneously.

CC suggestion module 932 may implement various functionality into receiver 900 related to the suggestion services and methods described above. For example, CC suggestion module 932, may receive text data from decoder module 933, corresponding to decoded closed caption or subtitle streams included in transponder streams received by tuners 915. Further CC suggestion module 932 may perform analysis of the text data to generate keywords and word lists and to compare text data for matches with keywords in a word list. Additionally, CC suggestion module 932 may generate or facilitate the generation of interface elements included in a user interface generated by receiver 900 to allow population or changing keywords in a word list, or to display a match of one or more keywords or to request user input. For example, accessibility module 932 may directly generate interface elements display on a display device using the output interface 935.

The network information table (NIT) 940 may store information used by receiver 900 to access various television channels. NIT 940 may be stored locally by a processor, such as tuning management processor 910-2 and/or by storage medium 925. Information used to populate NIT 940 may be received via satellite (or cable) through tuners 915, may be received via network interface 920, such as from the television service provider. As such, information present in NIT 940 may be periodically updated. In some embodiments, NIT 940 may be locally-stored by receiver 900 using storage medium 925. Generally, NIT 940 may store information about a service provider network, such as a satellite-based service provider network. Information that may be present in NIT 940 may include: television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or subchannel identifiers for various television channels. In some embodiments, NIT 940 may contain additional data or additional tables may be stored by the receiver. For example, while specific audio PIDs and video PIDs may not be present in NIT 940, a channel identifier may be present within NIT 940 which may be used to look up the audio PIDs and video PIDs in another table, such as a program map table (PMT). In some embodiments, a PID associated with the data for the PMT is indicated in a separate table, program association table (PAT), which is not illustrated in FIG. 9. A PAT may be stored by the receiver in a similar manner to the NIT. For example, a PMT may store information on audio PIDs, and/or video PIDs. A PMT stores data on ECM (entitlement control message) PIDs for television channels that are transmitted on a transponder stream, transport stream, or digital broadcast. If, for a first television channel, multiple television channels are to be tuned to, NIT 940 and/or PMT 957 may indicate a second television channel that is to be tuned to when a first channel is tuned to; this may allow for switching to output of the second television channel for different commercials, for example.

A table, such as the NIT, PAT, or PMT may store indications of PIDs that are related to supplemental audio content for individual channels or other forms of content. For instance, each television channel may be associated with a different supplemental audio PID. If supplemental audio content is to be transmitted for a given television channel, packets containing the supplemental audio are transmitted to the receiver having its associated supplemental audio content PID. This PID could be distinct from any of the audio programs of the television programming (e.g., the first audio program, second audio program (SAP), actual descriptive audio). In some embodiments, supplemental audio content is transmitted using the same transponder stream as the television channel or content to which the supplemental audio content corresponds. In some embodiments, a single supplemental audio PID is used to identify supplemental audio for multiple television channels, such as all the television channels on a given transponder. A second identifier present within the supplemental audio data may be used to distinguish for which television channel the supplemental audio data corresponds. PIDs may also be used to identify textual information, such as closed caption or secondary language caption information.

Based on information in the NIT, it may be possible to determine the proper satellite and transponder to which to tune for a particular television channel, or to determine the proper antenna and frequency to which to tune to for a particular television channel. In some embodiments, the NIT may list a particular frequency to which to tune for a particular television channel. Once tuned to the proper satellite/transponder/antenna/frequency, the PMT PID may be used to retrieve a program map table that indicates the PIDs for audio and video streams of television channels transmitted by that transponder.

While a large portion of storage space of storage medium 925 may be devoted to storage of television programming, a portion may be devoted to storage of non-audio/video data, such as EPG database 930 and other non-video/audio data 931. This "other" data may permit receiver 900 to function properly. In some embodiments, at least ten gigabytes are allocated to such other data. For example, if NIT 940 is stored by storage medium 925, it may be part of other non-video/audio data 931.

Decoder module 933 may serve to convert encoded video and audio into a format suitable for output to a display device. For instance, decoder module 933 may receive MPEG video and audio from storage medium 925, network interface 920, or descrambling engine 965 to be output to a television. MPEG video and audio from storage medium 924 may have been recorded to DVR database 945 as part of a previously-recorded television program. Decoder module 933 may convert the MPEG video and audio into a format appropriate to be displayed by a television or other form of display device and audio into a format appropriate to be output from speakers, respectively. Decoder module 933 may have the ability to convert a finite number of television channel streams received from storage medium 925, network interface 920 or descrambling engine 965 simultaneously. For instance, each of decoders 934 within decoder module 933 may be able to only decode a single television channel at a time.

While a television channel is being decoded by a decoder of decoders 934, the television channel is not necessarily output to a display device via television interface 935. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of decoder module 933 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames may be properly decoded. The output of the decoder, which is provided to television interface 935, may be controlled by control processor 910-1 or some other processor. While decoder module 933 is illustrated as having three decoders 934 (decoder 934-1, decoder 934-2, and decoder 934-3), in other embodiments, a greater or fewer number of decoders may be present in receiver 900. As described above, text data included in a television channel may be decoded by decoder module 933 and passed to CC suggestion module 933 for implementation of the inventive aspects described herein.

Television interface 935 may serve to output a signal to a television (or another form of display device) in a proper format for display of video and playback of audio. As such, television interface 935 may output one or more television channels, stored television programming from storage medium 925 (e.g., television programs from DVR database 945, television programs from on-demand programming 927 and/or information from EPG database 930) to a television for presentation.

Digital Video Recorder (DVR) functionality may permit a television channel to be recorded for a period of time. DVR functionality of receiver 900 may be managed by control processor 910-1. Control processor 910-1 may coordinate the television channel, start time, and stop time of when recording of a television channel is to occur. DVR database 945 may store information related to the recording of television channels. DVR database 945 may store timers that are used by control processor 910-1 to determine when a television channel should be tuned to and its programs recorded to DVR database 945 of storage medium 925. In some embodiments, a limited amount of storage medium 925 may be devoted to DVR database 945. Timers may be set by the television service provider and/or one or more users of receiver 900.

DVR database 945 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to receiver 900 via the television provider's network. For example, referring to satellite television distribution system 100 of FIG. 1, in a satellite-based television service provider system, data necessary to create the provider-defined timers at receiver 150 may be received via satellite. It will be appreciated that accessibility systems described herein may be configured to receive and or identify provider-defined timers as interface elements, such as interface elements having a particular focus, and may generate accessible interface elements corresponding to accessible alternative versions of the provider-defined timers.

As an example of DVR functionality of receiver 900 being used to record based on provider-defined timers, a television service provider may configure receiver 900 to record television programming on multiple, predefined television channels for a predefined period of time, on predefined dates. For instance, a television service provider may configure receiver 900 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 925 for provider-managed television programming storage.

On-demand programming 927 may represent additional television programming stored by storage medium 925. On-demand programming 927 may include television programming that was not recorded to storage medium 925 via a timer (either user- or provider-defined). Rather, on-demand programming is programming provided to the receiver directly for storage by the receiver and for later presentation to one or more users. On-demand programming 927 may not be user-selected. As such, the television programming stored to on-demand programming storage 927 may be the same for each receiver of a television service provider.

User interface 950 may include a remote control (physically separate from receiver 900) and/or one or more buttons on receiver 900 that allow a user to interact with receiver 900. User interface 950 may be used to select a television channel for viewing, view information from EPG database 930, and/or program a timer stored to DVR database 945, wherein the timer is used to control the DVR functionality of control processor 910-1. User interface 950 may also be used to transmit commands to receiver 900.

Referring back to tuners 915, television channels received via satellite (or cable) may contain at least some scrambled data. Packets of audio and video may be scrambled to prevent unauthorized users (e.g., nonsubscribers) from receiving television programming without paying the television service provider. When a tuner of tuners 915 is receiving data from a particular transponder of a satellite, the transponder stream may be a series of data packets corresponding to multiple television channels. Each data packet may contain a packet identifier (PID), which, in combination with NIT 940 and/or PMT 957, may be determined to be associated with a particular television channel. Particular data packets, referred to as entitlement control messages (ECMs), may be periodically transmitted. ECMs may be associated with another PID and may be encrypted; receiver 900 may use decryption device 960 to decrypt ECMs. Decryption of an ECM may only be possible if the user has authorization to access the particular television channel associated with the ECM. When an ECM is determined to correspond to a television channel being stored and/or displayed, the ECM may be provided to decryption device 960 for decryption.

Decryption device 960 may be a removable or non-removable smart card. When decryption device 960 receives an encrypted ECM, decryption device 960 may decrypt the ECM to obtain some number of control words. In some embodiments, from each ECM received by decryption device 960, two control words are obtained. In some embodiments, when decryption device 960 receives an ECM, it compares the ECM to the previously received ECM. If the two ECMs match, the second ECM is not decrypted because the same control words would be obtained. In other embodiments, each ECM received by decryption device 960 is decrypted; however, if a second ECM matches a first ECM, the outputted control words will match; thus, effectively, the second ECM does not affect the control words output by decryption device 960. Decryption device 960 may be permanently part of receiver 900 or may be configured to be inserted and removed from receiver 900. In some embodiments, control processor 910-1, tuning management processor 910-2, or other hardware may be able to determine that a received ECM has not changed from the previous iteration, and therefore not provide the repeated ECM to the smart card, since the same control word(s) will be obtained.

Tuning management processor 910-2 may be in communication with tuners 915 and control processor 910-1. Tuning management processor 910-2 may be configured to receive commands from control processor 910-1. Such commands may indicate when to start/stop recording a television channel and/or when to start/stop causing a television channel to be output to a television. Tuning management processor 910-2 may control tuners 915. From tuners 915, tuning management processor 910-2 may receive transponder streams of packetized data. From network interface 920, tuning management processor 910-2 may receive network transport stream of packetized data. As previously detailed, some or all of these packets may include a PID that identifies the content of the packet.

Tuning management processor 910-2 may be configured to create one or more PID filters 955 that sort packets received from tuners 915 and/or network interface 920 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 940 or another table, such as a program association table (PAT). From the PMT data packets, PMT may be constructed by tuning management processor 910-2.

PID filters 955 may be configured to filter data packets based on PIDs. In some embodiments, PID filters 955 are created and executed by tuning management processor 910-2. For each television channel to be output for presentation or recorded, a separate PID filter may be configured. In other embodiments, separate hardware may be used to create and execute such PID filters. Depending on a television channel selected for recording/viewing, a PID filter may be created to filter: (1) the video packets associated with the television channel; (2) the audio packets associated with the television channel; and (3), if enabled, supplemental audio content for use in conjunction with interactive content. PMT 957 may store the particular assignments of PIDs for individual television channels. For example, if a transponder data stream includes multiple television channels, data packets corresponding to a television channel that is not desired to be stored or displayed by the user may be ignored by PID filters 955 and not routed to descrambling engine 965, decryption device 960 or control processor 910-1. As such, only data packets corresponding to the one or more television channels desired to be stored and/or displayed may be filtered and passed to either descrambling engine 965 or decryption device 960; other data packets may be ignored. For each television channel, a stream of video packets, a stream of audio packets (one or both of the audio programs), a stream of supplemental audio content, and/or a stream of ECM packets may be present, each stream identified by a PID. In some embodiments, a common ECM stream may be used for multiple television channels. Additional data packets corresponding to other information, such as updates to NIT 940, may be appropriately routed by PID filters 955. At a given time, one or multiple PID filters may be executed by tuning management processor 910-2.

Descrambling engine 965 may use the control words output by decryption device 960 in order to descramble video and/or audio corresponding to television channels for storage and/or presentation. Video and/or audio data contained in the transponder data stream received by tuners 915 may be scrambled. Video and/or audio data may be descrambled by descrambling engine 965 using a particular control word. Which control word output by decryption device 960 to be used for successful descrambling may be indicated by a scramble control identifier present within the data packet containing the scrambled video or audio. Descrambled video and/or audio may be output by descrambling engine 965 to storage medium 925 for storage (in DVR database 945) and/or to decoder module 933 for output to a television or other presentation equipment via television interface 935.

For simplicity, receiver 900 of FIG. 9 has been reduced to a block diagram; commonly known parts, such as a power supply, have been omitted. Further, some routing between the various modules of receiver 900 has been illustrated. Such illustrations are for exemplary purposes only. The state of two modules not being directly or indirectly connected does not indicate the modules cannot communicate. Rather, connections between modules of the receiver 900 are intended only to indicate possible common data routing. It should be understood that the modules of receiver 900 may be combined into a fewer number of modules or divided into a greater number of modules.

Figure 10:
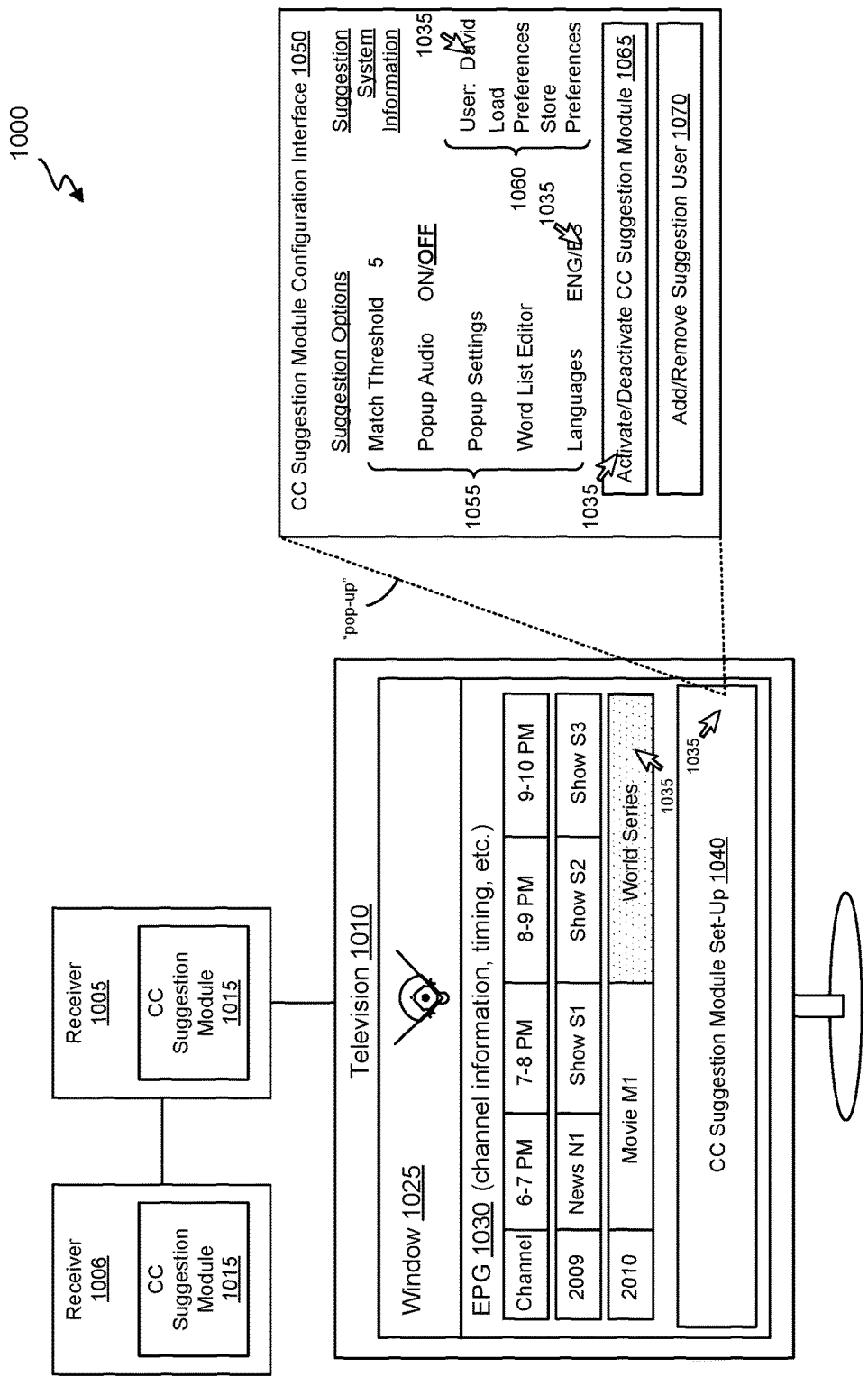
FIG. 10 provides a schematic illustration of aspects of a receiver incorporating a program suggestion module.

FIG. 10 depicts an example television display environment 1000. Display environment 1000 includes a receiver 1005 that generates a user interface for output by television 1010. Receiver 1005 includes CC suggestion module 1015, which may provide data related to accessibility interface elements to accessibility system 1020 for output.

In FIG. 10, television 1010 displays a window 1025 that includes video, such as video corresponding to a television channel received from a cable, satellite, or over-the air broadcast system. Television 1010 also displays an electronic program guide (EPG) 1030, which corresponds to channel information, timing of programs, and the like, for television programs and channels that may be displayed by receiver 1005 and television 1010. As illustrated, the EPG 1030 identifies a first channel "2009," which may correspond, for example, to a first television channel, and a second channel "2010," which may correspond, for example, to a second television channel. Items in the EPG 1030 may be selectable using a user interface that may make use of a remote control or other input device to interact with EPG 1030. As illustrated, indicator 1035 may highlight, as an example program, the World Series for immediate display on television 1010, such as in window 1025. Other features may also be implemented using the interface displayed, such as selection of recording one or more television channels or programs for storage to a DVR database.

The display interface may also include an item 1040 to access CC suggestion module set-up interface 1050, which may allow for selection of a command for the receiver to configure the CC suggestion module 1015, for example. As an example, selection of the command to configure the CC suggestion module 1015, may generate a "pop-up" window or other interface that allows for interaction and control over configuration or information aspects relating to CC suggestion module 1015. In the CC suggestion module configuration interface 1050 that is generated, options 1055 may be selected, activated, changed, or displayed, for example. Useful options 1055 may include, but are not limited to, activation, deactivation, and/or configuration of a match threshold, such as to allow for more or fewer matches to be required before a suggestion is presented to a user, activation, deactivation, or configuration of popup settings, such as to facilitate default popup options, such as default option selection and default option timing and popup location and/or size on screen, activation, deactivation, or configuration of word lists, such as to facilitate keyword input entry and editing of word lists, activation, deactivation, or configuration of a language, including a primary language and/or a secondary language, when available. It will be appreciated that selection of a particular language may allow the CC suggestion module to make use of primary closed captions and/or secondary language closed captions to expand the potential suggestions made to a user.

Also included in accessibility module configuration interface 1050 may be an informational item 1060 that may provide for selection of a particular user, loading of preferences, storing of preferences.

Accessibility module configuration interface 1050 may also include an option 1065 for activating or deactivating the CC suggestion module 1015, such as to add/or remove interface features of receiver 1005 that relate to CC suggestion module 1015. CC suggestion module configuration interface 1050 may also include an option 1070 for adding, removing, or editing users associated with CC suggestion module 1015.

Receiver 1006 may be in data communication with receiver 1005, such as by way of a network connection, and CC suggestion module 1015 of receiver 1006 may forward detected matches to receiver 1005 for suggestion to a user.

Figure 11:
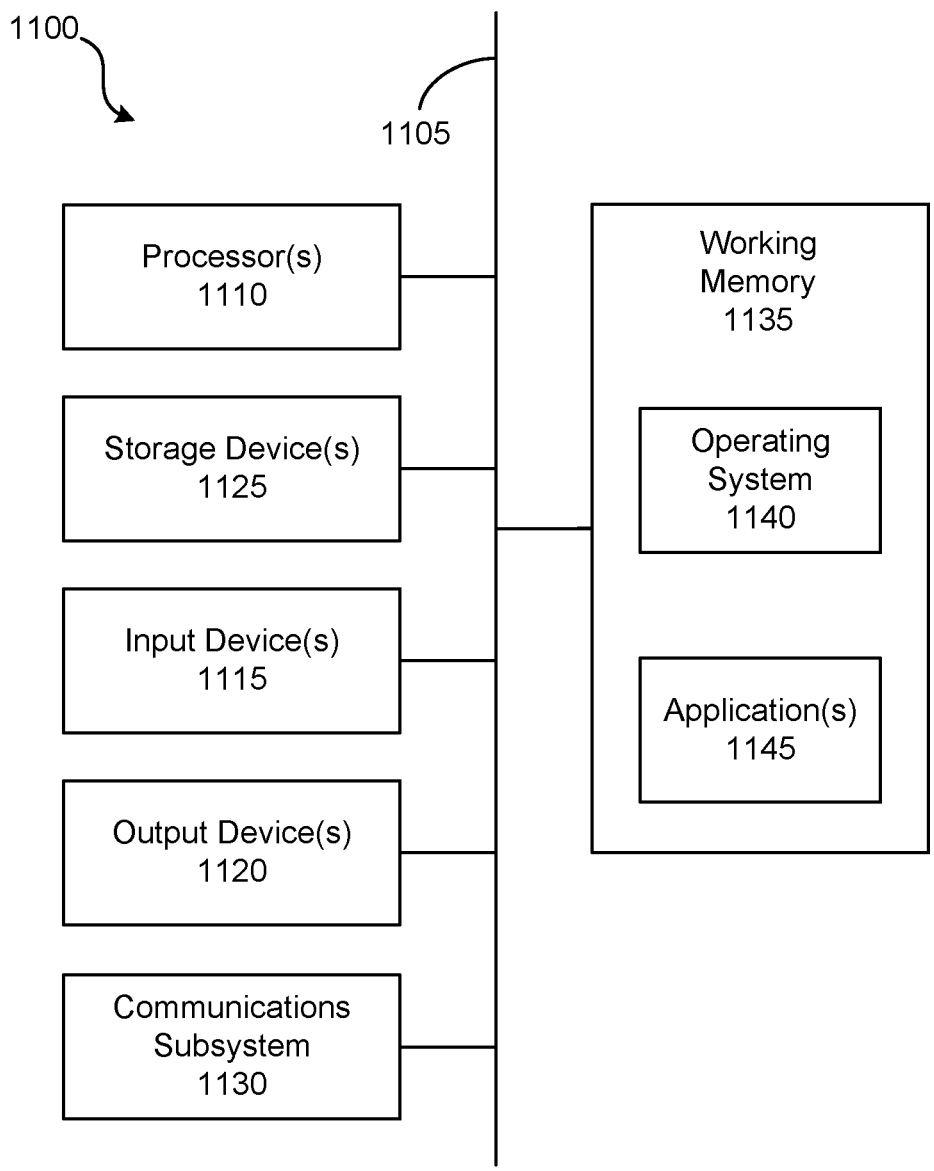
FIG. 11 provides a block diagram of an example computing device.

A computing device as illustrated in FIG. 11 may be incorporated as part of the previously described computerized devices, such as a television service provider system, a television receiver, a television, a set-top box, etc. FIG. 11 provides a schematic illustration of one embodiment of a computing device 1100 that may perform various steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computing device 1100 is shown comprising hardware elements that may be electrically coupled via a bus 1105 (or may otherwise be in communication). The hardware elements may include one or more processors 1110, including without limitation one or more general-purpose processors and/or one or more special-purpose processors (such as digital signal processing chips, graphics acceleration processors, video decoders, and/or the like); one or more input devices 1115, which may include without limitation a mouse, a touchscreen, keyboard, remote control, voice input, and/or the like; and one or more output devices 1120, which may include without limitation a display device, a printer, speaker, etc.

The computing device 1100 may further include (and/or be in communication with) one or more non-transitory storage devices 1125, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device 1100 might also include a communications subsystem 1130, which may include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), a G.hn device, and/or the like. The communications subsystem 1130 may permit data to be exchanged with a network (such as the network described below, to name one example), other computer systems, and/or any other devices described herein. In many embodiments, the computing device 1100 will further comprise a working memory 1135, which may include a RAM or ROM device, as described above.

The computing device 1100 also may comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1125 described above. In some cases, the storage medium might be incorporated within a computer system, such as computing device 1100. In other embodiments, the storage medium might be separate from a computer system (e.g., a removable medium, such as a compact disc, or a cloud- or network-based storage system), and/or provided in an installation package, such that the storage medium may be used to program, configure, and/or adapt a general purpose computer with the instructions/code stored thereon. These instructions might take the form of executable code, which is executable by the computing device 1100 and/or might take the form of source and/or installable code, which, upon compilation and/or installation on the computing device 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computing device (such as the computing device 1100) to perform methods in accordance with various embodiments of the invention. According to a set of embodiments, some or all of the procedures of such methods are performed by the computing device 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the non-transitory storage device(s) 1125. Merely by way of example, execution of the sequences of instructions contained in the working memory 1135 might cause the processor(s) 1110 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1100.

The communications subsystem 1130 (and/or components thereof) generally will receive signals, and the bus 1105 then might carry the signals (and/or the data, instructions, etc. carried by the signals) to the working memory 1135, from which the processor(s) 1110 retrieves and executes the instructions. The instructions received by the working memory 1135 may optionally be stored on a non-transitory storage device 1125 either before or after execution by the processor(s) 1110.

It should further be understood that the components of computing device 1100 may be distributed across a network. For example, some processing may be performed in one location using a first processor while other processing may be performed by another processor remote from the first processor. Other components of computing device 1100 may be similarly distributed. As such, computing device 1100 may be interpreted as a distributed computing system that performs processing in multiple locations. In some instances, computing device 1100 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A television receiver, comprising:
   one or more processors;
   a plurality of tuners communicatively coupled with the one or more processors;
   an audio-video output interface communicatively coupled with the one or more processors; and
   a non-transitory computer readable storage medium communicatively coupled with and readable by the one or more processors and having stored therein processor-readable instructions that, when executed by the one or more processors, cause the one or more processors to perform operations including:
      receiving input corresponding to determination of one or more user-designated keywords;
      receiving first program content using an active tuner of the plurality of tuners;
      outputting the first program content using the audio-video output interface for display on a display device;
      receiving second program content using an inactive tuner of the plurality of tuners;
      obtaining text data corresponding to an audio portion of the second program content;
      determining that a first keyword of the one or more user-designated keywords appears in the text data; and
      generating a first interface for output by the audio-video output interface for display on the display device in real-time upon determining that the first keyword appears in the text data, wherein the first interface includes a notification identifying a match of the first keyword.

2. The television receiver of claim 1, wherein the inactive tuner corresponds to a tuner of the plurality of tuners that is not being actively used to output live program content for display on the display device or to record program content according to a recording schedule or timer.

3. The television receiver of claim 1, wherein obtaining the text data includes one or more of:
   decoding a closed caption portion of the second program content to generate the text data,
   decoding a subtitle portion of the second program content to generate the text data,
   retrieving the text data from a network location,
   processing the audio portion of the second program content using a speech-to-text algorithm to generate the text data, or
   rendering embedded closed captions or subtitles of the second program content and generating the text data by performing character recognition on the embedded closed captions or subtitles.

4. The television receiver of claim 1, wherein the input corresponds to user entry of the one or more user-designated keywords or to user selection of one or more user-designated keywords from a word list.

5. The television receiver of claim 1, wherein the operations further comprise:
   automatically determining one or more additional keywords without user input;
   determining that a second keyword of the one or more additional keywords appears in the text data; and
   generating a second interface for output by the audio-video output interface for display on the display device in real-time upon determining that the second keyword appears in the text data, wherein the second interface identifies the second keyword and the second program content.

6. The television receiver of claim 5, wherein automatically determining the one or more additional keywords without user input includes:
   monitoring recorded or watched text data corresponding to audio portions of at least one of program content recorded by the television receiver and program content output by the audio-video output interface for immediate display on the display device;
   evaluating the recorded or watched text data to rank words appearing in the watched or recorded text data by frequency; and
   adding one or more words appearing in the recorded or watched text data having rankings greater than a threshold ranking to a word list corresponding to the one or more additional keywords.

7. The television receiver of claim 1, wherein the first interface requests selection of a command, wherein the command corresponds to at least one of:
   record the second program content,
   immediately output the second program content for display on the display device, or
   ignore the second program content.

8. The television receiver of claim 1, wherein the first interface corresponds to a notification overlaid on a graphical user interface, an electronic programming guide, or other program content being output by the audio-video output interface for display on the display device.

9. The television receiver of claim 1, further comprising:
   receiving second program content using a second inactive tuner of the plurality of tuners;
   obtaining second text data corresponding to audio of the second program content;
   determining that a second keyword of the one or more user-designated keywords appears in the second text data; and
   generating a second interface for output by the audio-video output interface for display on the display device in real-time upon determining that the second keyword appears in the second text data, wherein the second interface identifies the second keyword and the second program content.

10. A method, comprising:
    receiving, by a television receiver, input corresponding to determination of one or more user-designated keywords;
    receiving, by the television receiver, first program content using an active tuner of the television receiver;
    outputting, by the television receiver, the first program content for display by a display device;

receiving, by the television receiver, second program content using an inactive tuner of the television receiver;

obtaining, by the television receiver, text data corresponding to an audio portion of the second program content;

determining, by the television receiver, that a first keyword of the one or more user-designated keywords appears in the text data; and generating, by the television receiver, a first interface for display on the display device in real-time upon determining that the first keyword appears in the text data, wherein the first interface includes a notification identifying a match of the first keyword.

11. The method of claim 10, wherein obtaining the text data includes one or more of:

decoding a closed caption portion of the second program content to generate the text data, decoding a subtitle portion of the second program content to generate the text data, retrieving the text data from a network location, processing the audio portion of the second program content using a speech-to-text algorithm to generate the text data, or rendering embedded closed captions or subtitles of the second program content and generating the text data by performing character recognition on the embedded closed captions or subtitles.

12. The method of claim 10, further comprising automatically determining one or more additional keywords without user input;

determining that a second keyword of the one or more additional keywords appears in the text data; and generating a second interface for display on the display device in real-time upon determining that the second keyword appears in the text data, wherein the second interface identifies the second keyword and the second program content.

13. The method of claim 12, wherein automatically determining the one or more additional keywords without user input includes:

monitoring recorded or watched text data corresponding to audio portions of at least one of program content recorded by the television receiver and program content output by the television receiver for immediate display on the display device;

evaluating the recorded or watched text data to rank words appearing in the watched or recorded text data by frequency; and adding one or more words appearing in the recorded or watched text data having rankings greater than a threshold ranking to a word list corresponding to the one or more additional keywords.

14. The method of claim 10, wherein the first interface requests selection of a command, wherein the command corresponds to at least one of:

record the second program content, immediately output the second program content for display on the display device, or ignore the second program content.

15. The method of claim 10, further comprising:

receiving, by the television receiver, second program content using a second inactive tuner of the television receiver;

obtaining, by the television receiver, second text data corresponding to audio of the second program content;

determining, by the television receiver, that a second keyword of the one or more user-designated keywords appears in the second text data; and generating, by the television receiver, a second interface for display on the display device in real-time upon determining that the second keyword appears in the second text data, wherein the second interface identifies the second keyword and the second program content.

16. A non-transitory computer readable storage medium comprising instructions that, when executed by one or more processors, cause the one or more processors to perform operations including:

receiving input corresponding to determination of one or more user-designated keywords;

receiving first program content using an active tuner;

outputting the first program content for display by a display device;

receiving second program content using an inactive tuner;

obtaining text data corresponding to an audio portion of the second program content;

determining that a first keyword of the one or more user-designated keywords appears in the text data; and generating a first interface for display on the display device in real-time upon determining that the first keyword appears in the text data, wherein the first interface includes a notification identifying a match of the first keyword.

17. The non-transitory computer readable storage medium of claim 16, wherein obtaining the text data includes one or more of:

decoding a closed caption portion of the second program content to generate the text data, decoding a subtitle portion of the second program content to generate the text data, retrieving the text data from a network location, processing the audio portion of the second program content using a speech-to-text algorithm to generate the text data, or rendering embedded closed captions or subtitles of the second program content and generating the text data by performing character recognition on the embedded closed captions or subtitles.

18. The non-transitory computer readable storage medium of claim 16, wherein the operations further include:

automatically determining one or more additional keywords without user input;

determining that a second keyword of the one or more additional keywords appears in the text data; and generating a second interface for display on the display device in real-time upon determining that the second keyword appears in the text data, wherein the second interface identifies the second keyword and the second program content.

19. The non-transitory computer readable storage medium of claim 18, wherein automatically determining the one or more additional keywords without user input includes:

monitoring recorded or watched text data corresponding to audio portions of at least one of program content being instantly recorded and program content output for immediate display on the display device;

evaluating the recorded or watched text data to rank words appearing in the watched or recorded text data by frequency; and adding one or more words appearing in the recorded or watched text data having rankings greater than a threshold ranking to a word list corresponding to the one or more additional keywords.

20. The non-transitory computer readable storage medium of claim 16, wherein the operations further include:
- receiving second program content using a second inactive tuner;
- obtaining second text data corresponding to audio of the second program content;
- determining that a second keyword of the one or more user-designated keywords appears in the second text data; and
- generating a second interface for display on the display device in real-time upon determining that the second keyword appears in the second text data, wherein the second interface identifies the second keyword and the second program content.

\* \* \* \* \*